United States Patent
Khlat et al.

(10) Patent No.: US 8,020,026 B1
(45) Date of Patent: Sep. 13, 2011

(54) PHASE-ALIGNING CORRECTED AND UNCORRECTED CLOCKS

(75) Inventors: Nadim Khlat, Midi-Pyrenees (FR); Navid Foroudi, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 742 days.

(21) Appl. No.: 12/040,115

(22) Filed: Feb. 29, 2008

(51) Int. Cl.
*G06F 1/04* (2006.01)
*G06F 1/24* (2006.01)
*G06F 11/00* (2006.01)

(52) U.S. Cl. ......... 713/503; 713/500; 713/501; 713/600

(58) Field of Classification Search .................. 713/500, 713/501, 503, 600
See application file for complete search history.

(56) References Cited

U.S. PATENT DOCUMENTS

| | | | |
|---|---|---|---|
| 5,982,831 A * | 11/1999 | Chu ............................... | 375/371 |
| 6,661,267 B2 * | 12/2003 | Walker et al. .................. | 327/159 |
| 6,898,420 B2 | 5/2005 | Black et al. | |
| 7,321,755 B2 * | 1/2008 | Hulvey ....................... | 455/343.1 |
| 7,581,132 B2 * | 8/2009 | Plourde .......................... | 713/500 |
| 7,605,665 B2 * | 10/2009 | Chambers et al. .............. | 331/16 |
| 2004/0023680 A1 * | 2/2004 | Hulvey ......................... | 455/522 |
| 2007/0066268 A1 * | 3/2007 | Simic et al. .................... | 455/318 |
| 2008/0046776 A1 * | 2/2008 | Law et al. ...................... | 713/501 |
| 2008/0290954 A1 * | 11/2008 | Chambers et al. .............. | 331/18 |
| 2009/0140896 A1 * | 6/2009 | Adduci et al. ................. | 341/131 |
| 2010/0099434 A1 * | 4/2010 | Murayama et al. ........ | 455/456.1 |

\* cited by examiner

*Primary Examiner* — Thomas Lee
*Assistant Examiner* — Jaweed A Abbaszadeh
(74) *Attorney, Agent, or Firm* — Withrow & Terranova, P.L.L.C.

(57) ABSTRACT

The present invention relates to providing a system clock signal that is based on either a first clock signal that is capable of being frequency-corrected or a second clock signal that is not capable of being frequency-corrected, depending on system needs. When the system clock signal is based on the second clock signal, all or part of the circuitry that provides the first clock signal may be disabled or powered-down to reduce power consumption. A multiplexer may be used to select either the first or the second clock signal to provide the system clock signal to system circuitry. The system circuitry may be intolerant of phase-jumps in the system clock signal; therefore, before the multiplexer transitions between the first and the second clock signals, the first clock signal may be phase-adjusted to bring it into phase-alignment with the second clock signal.

25 Claims, 26 Drawing Sheets

PHASE-ALIGNING CORRECTED AND UNCORRECTED CLOCKS

FIELD OF THE INVENTION

The present invention relates to corrected and uncorrected clock signals that are used in digital circuitry and that may be used in radio frequency (RF) communications circuitry.

BACKGROUND OF THE INVENTION

As technology progresses, portable devices tend to integrate more features. For example, portable devices may include features associated with personal digital assistants (PDAs), cellular telephones, wireless internet access devices, music players, such as MP3 players, global positioning system (GPS) receivers, and the like. Such portable devices may support one or more wireless communications protocols, such as third (3G), fourth (4G), or later generation cellular telephone protocols, GPS protocols, wireless fidelity (Wi-Fi) protocols, Bluetooth®, and the like.

Some wireless communications protocols send a reference timing signal embedded in an RF signal to a portable device for the purpose of correcting internal clock signals within the portable device. These corrected internal clock signals may be used to provide frequency-accurate transmit signals from the portable device, or may be used in frequency-accurate applications, such as GPS navigation. Generating frequency-corrected clock signals may require frequency synthesizer circuitry, which may have significant power requirements when enabled. Therefore, disabling the frequency synthesizer circuitry may be desirable when frequency-corrected clock signals are not needed, particularly in battery-powered devices.

System circuitry may need a frequency-corrected clock signal for certain applications, such as wireless communications, and may get by with a non-frequency-corrected clock signal for other applications, such as playing music. Thus, there is a need for clock circuitry that can provide a system clock signal that is frequency-corrected when needed and is not frequency-corrected when not needed to reduce power consumption, reduce noise, or the like.

SUMMARY OF THE INVENTION

The present invention relates to providing a system clock signal that is based on either a first clock signal that is capable of being frequency-corrected or a second clock signal that is not capable of being frequency-corrected, depending on system needs. When the system clock signal is based on the second clock signal, all or part of the circuitry that provides the first clock signal may be disabled or powered-down to reduce power consumption. A multiplexer may be used to select either the first or the second clock signal to provide the system clock signal to system circuitry. The system circuitry may be intolerant of phase-jumps in the system clock signal; therefore, before the multiplexer transitions between the first and the second clock signals, the first clock signal may be phase-adjusted to bring it into phase-alignment with the second clock signal, which may minimize phase-jumps in the system clock signal.

Clock synthesizer and adjustment circuitry synthesizes the first clock signal based on a reference clock signal that is also used to provide the second clock signal. The clock synthesizer and adjustment circuitry may apply a frequency correction to the first clock signal based on a frequency correction signal. The first clock signal may then be used for applications requiring frequency correction. One embodiment of the present invention begins with the multiplexer providing the system clock signal based on the second clock signal when the first clock signal is disabled. Then, in order to support an application requiring frequency correction, the first clock signal is enabled and phase-aligned with the second clock signal. The multiplexer transitions to provide the system clock signal based on the first clock signal. The frequency correction signal may be adjusted to provide appropriate frequency correction to the first clock signal. When frequency correction is no longer needed, the first clock signal may be phase-aligned with the second clock signal, and the multiplexer may transition to provide the system clock signal based on the second clock signal. Next, the first clock signal may be disabled to save power, reduce noise, or the like.

In a first embodiment of the present invention, the frequency correction signal may be adjusted to apply no frequency correction to the first clock signal, such that the frequency and phase of the first clock signal is about equal to the frequency and phase of the second clock signal. Next, the multiplexer may transition between the first and the second clock signals. In a second embodiment of the present invention, the clock synthesizer and adjustment circuitry may include a phase-locked loop (PLL) having a feedback divider circuit and a divide value dither circuit, which is used to dither the divide value of the feedback divider circuit to apply a frequency correction to the first clock signal. In addition to providing any needed frequency correction, the divide value dither circuit may be used to phase-adjust the first clock signal before multiplexer transitioning. In a third embodiment of the present invention, the clock synthesizer and adjustment circuitry may include a programmable delay circuit in series with the output of the PLL. The programmable delay circuit may be used to phase-adjust the first clock signal before multiplexer transitioning.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 shows clock synthesizer and adjustment circuitry, control circuitry, and a multiplexer providing a system clock signal to system circuitry, according to one embodiment of the present invention.

FIGS. 2A, 2B, 2C, 2D, 2E, and 2F are graphs showing timing relationships between a frequency correction signal, a mode selection signal, a clock enable signal, a first frequency-corrected clock signal, a reference clock signal, and the system clock signal, respectively, related to the circuitry illustrated in FIG. 1, according to one embodiment of the present invention.

FIGS. 3A, 3B, 3C, 3D, 3E, and 3F are graphs showing timing relationships between the frequency correction signal, the mode selection signal, the clock enable signal, and details of the first frequency-corrected clock signal, the reference clock signal, and the system clock signal, respectively, illustrated in FIGS. 2A, 2B, 2C, 2D, 2E, and 2F.

FIGS. 4A, 4B, 4C, 4D, 4E, and 4F are graphs showing timing relationships between the frequency correction signal, the mode selection signal, the clock enable signal, and additional details of the first frequency-corrected clock signal, the reference clock signal, and the system clock signal, respectively, illustrated in FIGS. 2A, 2B, 2C, 2D, 2E, and 2F.

FIGS. 5A, 5B, 5C, 5D, 5E, and 5F are graphs showing timing relationships between the frequency correction signal, the mode selection signal, the clock enable signal, and other details of the first frequency-corrected clock signal, the reference clock signal, and the system clock signal, respectively, illustrated in FIGS. 2A, 2B, 2C, 2D, 2E, and 2F.

FIGS. 6A, 6B, 6C, 6D, 6E, and 6F are graphs showing additional timing relationships between the frequency correction signal, the mode selection signal, the clock enable signal, the first frequency-corrected clock signal, the reference clock signal, and the system clock signal, respectively, related to the circuitry illustrated in FIG. 1, according to one embodiment of the present invention.

FIGS. 7A, 7B, 7C, 7D, 7E, and 7F are graphs showing timing relationships between the frequency correction signal, the mode selection signal, the clock enable signal, and details of the first frequency-corrected clock signal, the reference clock signal, and the system clock signal, respectively, illustrated in FIGS. 6A, 6B, 6C, 6D, 6E, and 6F.

FIGS. 8A, 8B, 8C, 8D, 8E, and 8F are graphs showing timing relationships between the frequency correction signal, the mode selection signal, the clock enable signal, and additional details of the first frequency-corrected clock signal, the reference clock signal, and the system clock signal, respectively, illustrated in FIGS. 6A, 6B, 6C, 6D, 6E, and 6F.

FIGS. 9A, 9B, 9C, 9D, 9E, and 9F are graphs showing timing relationships between the frequency correction signal, the mode selection signal, the clock enable signal, and other details of the first frequency-corrected clock signal, the reference clock signal, and the system clock signal, respectively, illustrated in FIGS. 6A, 6B, 6C, 6D, 6E, and 6F.

Figure 11:
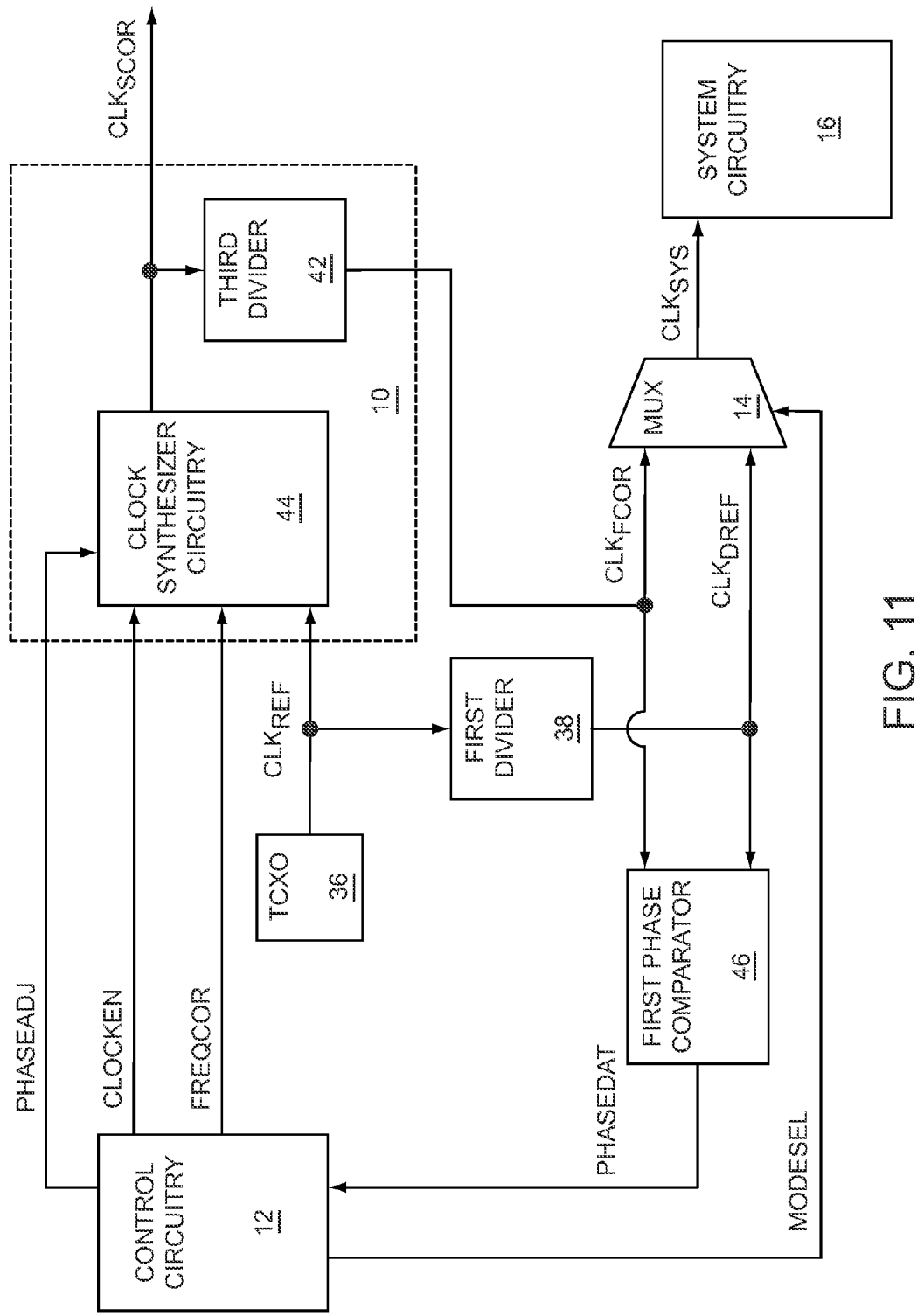
FIG. 11 shows the clock synthesizer and adjustment circuitry, the control circuitry, and the multiplexer providing the system clock signal to the system circuitry, according to an additional embodiment of the present invention.

FIGS. 14A, 14B, 14C, 14D, 14E, and 14F are graphs showing timing relationships between a phase adjustment signal, the mode selection signal, the frequency correction signal, the first frequency-corrected clock signal, the divided reference clock signal, and the system clock signal, respectively, related to the circuitry illustrated in FIG. 11, according to one embodiment of the present invention.

FIGS. 15A, 15B, 15C, 15D, 15E, and 15F are graphs showing timing relationships between the phase adjustment signal, the mode selection signal, the frequency correction signal, and details of the first frequency-corrected clock signal, the divided reference clock signal, and the system clock signal, respectively, illustrated in FIGS. 14A, 14B, 14C, 14D, 14E, and 14F.

FIGS. 16A, 16B, 16C, 16D, 16E, and 16F are graphs showing timing relationships between the phase adjustment signal, the mode selection signal, the frequency correction signal, and additional details of the first frequency-corrected clock signal, the divided reference clock signal, and the system clock signal, respectively, illustrated in FIGS. 14A, 14B, 14C, 14D, 14E, and 14F.

FIGS. 17A, 17B, 17C, 17D, 17E, and 17F are graphs showing timing relationships between the phase adjustment signal, the mode selection signal, the frequency correction signal, and other details of the first frequency-corrected clock signal, the divided reference clock signal, and the system clock signal, respectively, illustrated in FIGS. 14A, 14B, 14C, 14D, 14E, and 14F.

FIGS. 18A, 18B, 18C, 18D, 18E, and 18F are graphs showing additional timing relationships between the phase adjustment signal, the mode selection signal, the clock enable signal, the first frequency-corrected clock signal, the divided reference clock signal, and the system clock signal, respectively, related to the circuitry illustrated in FIG. 11, according to one embodiment of the present invention.

FIGS. 19A, 19B, 19C, 19D, 19E, and 19F are graphs showing timing relationships between the phase adjustment signal, the mode selection signal, the clock enable signal, and details of the first frequency-corrected clock signal, the divided reference clock signal, and the system clock signal, respectively, illustrated in FIGS. 18A, 18B, 18C, 18D, 18E, and 18F.

FIGS. 20A, 20B, 20C, 20D, 20E, and 20F are graphs showing timing relationships between the phase adjustment signal, the mode selection signal, the clock enable signal, and additional details of the first frequency-corrected clock signal, the divided reference clock signal, and the system clock signal, respectively, illustrated in FIGS. 18A, 18B, 18C, 18D, 18E, and 18F.

Figure 21:
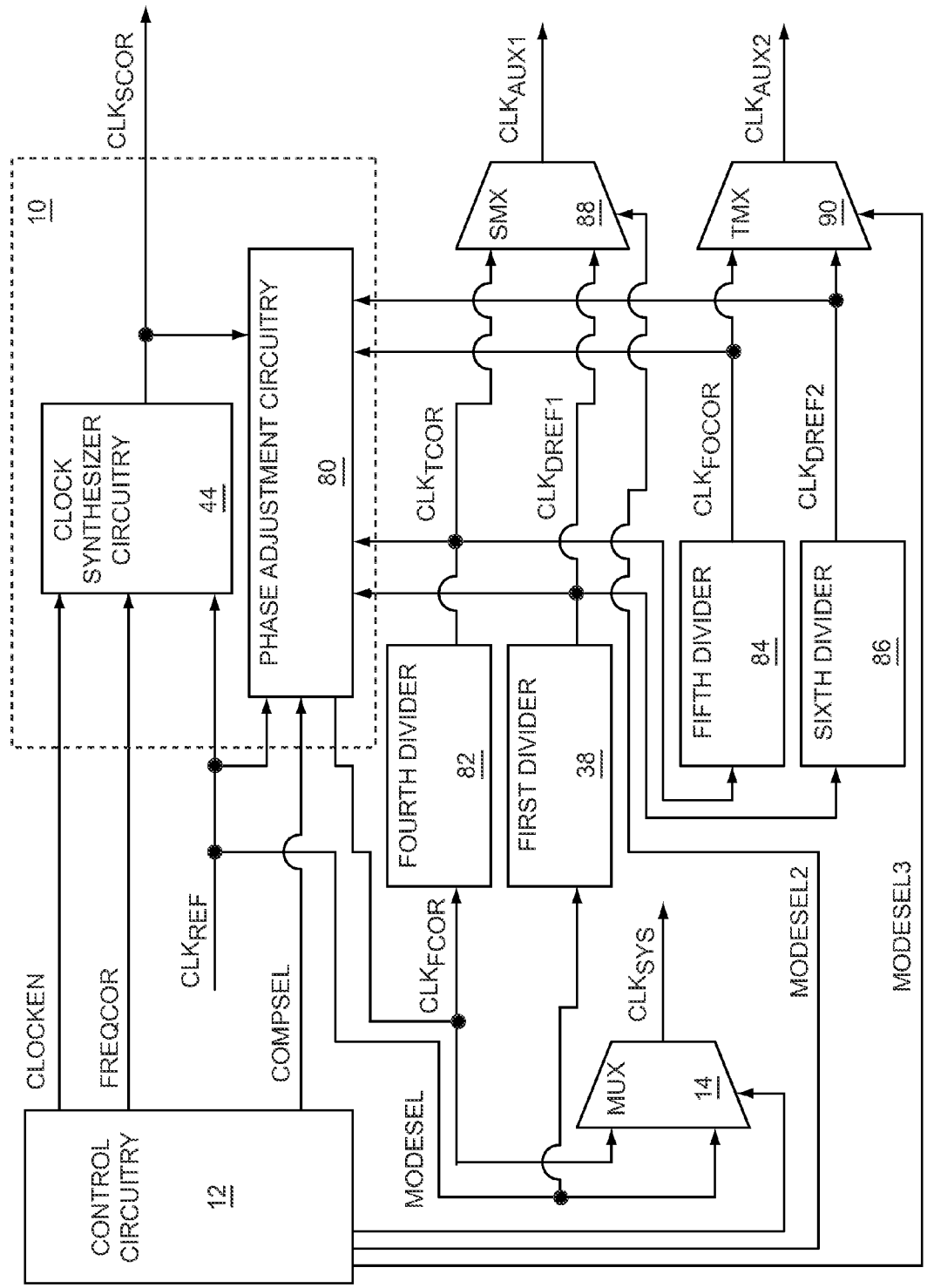

FIG. 21 shows the clock synthesizer and adjustment circuitry, the control circuitry, and several multiplexers providing the system clock signal and two auxiliary clock signals, according to an alternative embodiment of the present invention.

Figure 22:
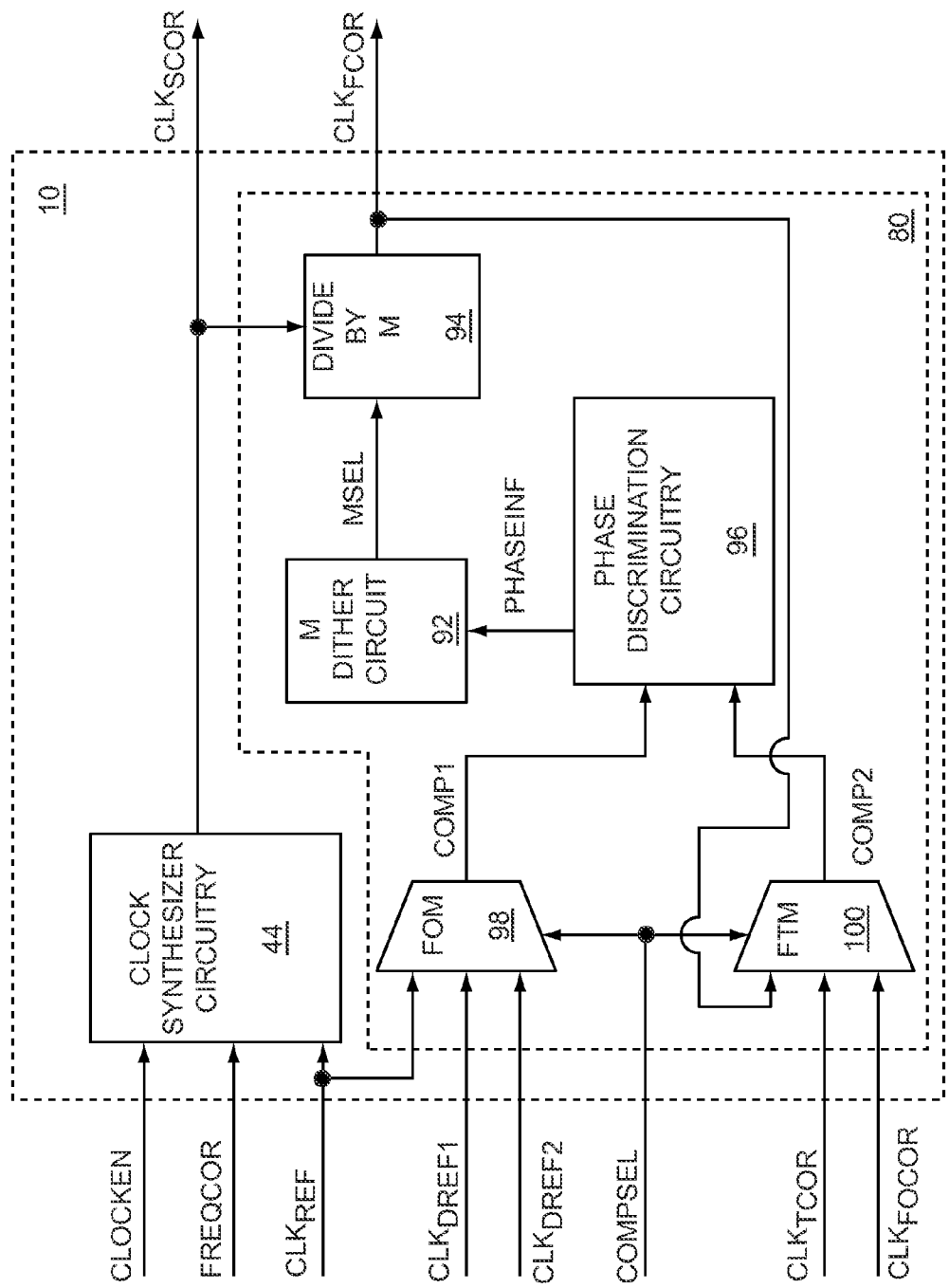

FIG. 22 shows details of the clock synthesizer and adjustment circuitry illustrated in FIG. 21.

Figure 23:
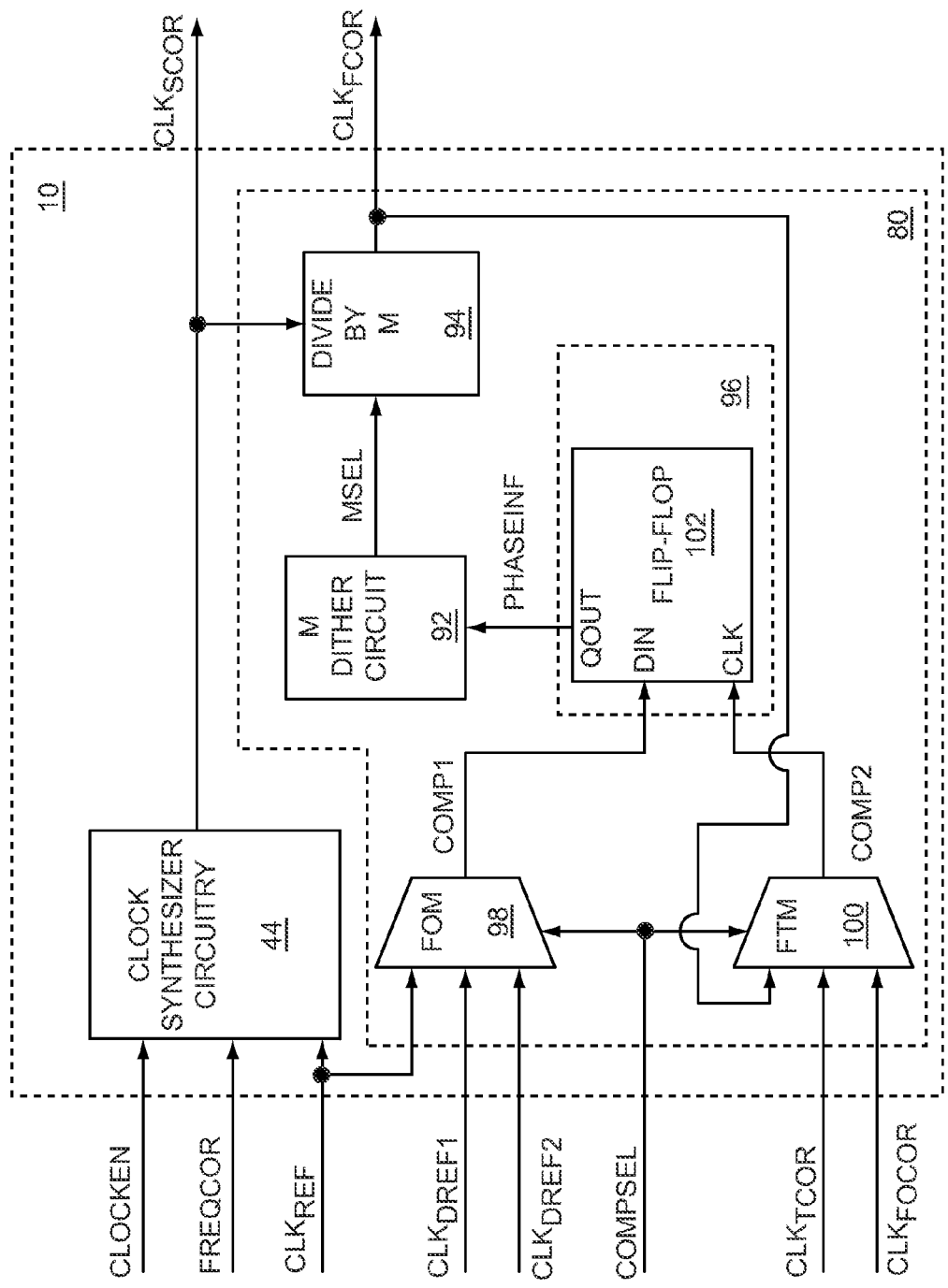

FIG. 23 shows details of phase discrimination circuitry illustrated in FIG. 22.

Figure 24:
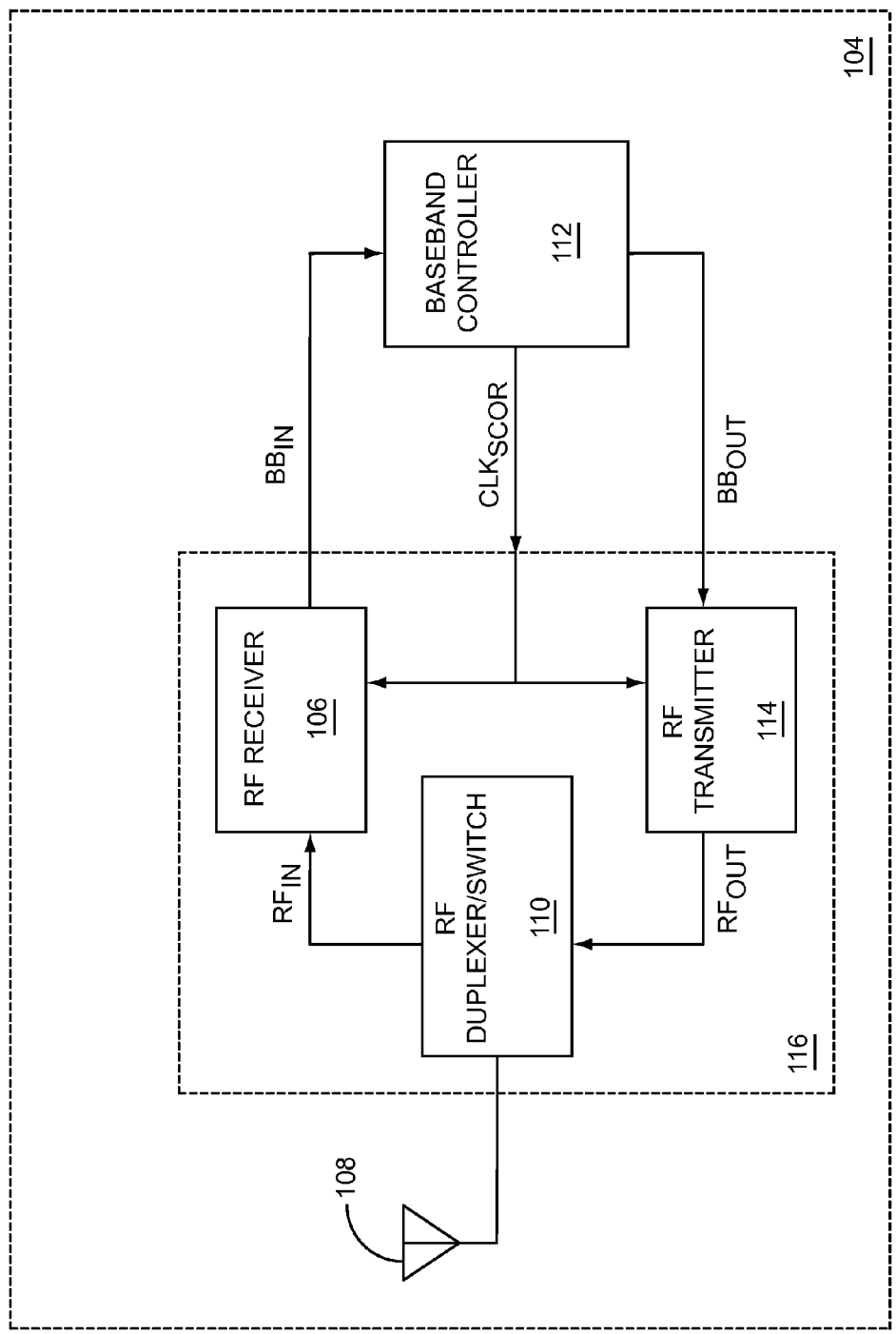

FIG. 24 shows an RF communications circuit, according to one embodiment of the present invention.

Figure 25:
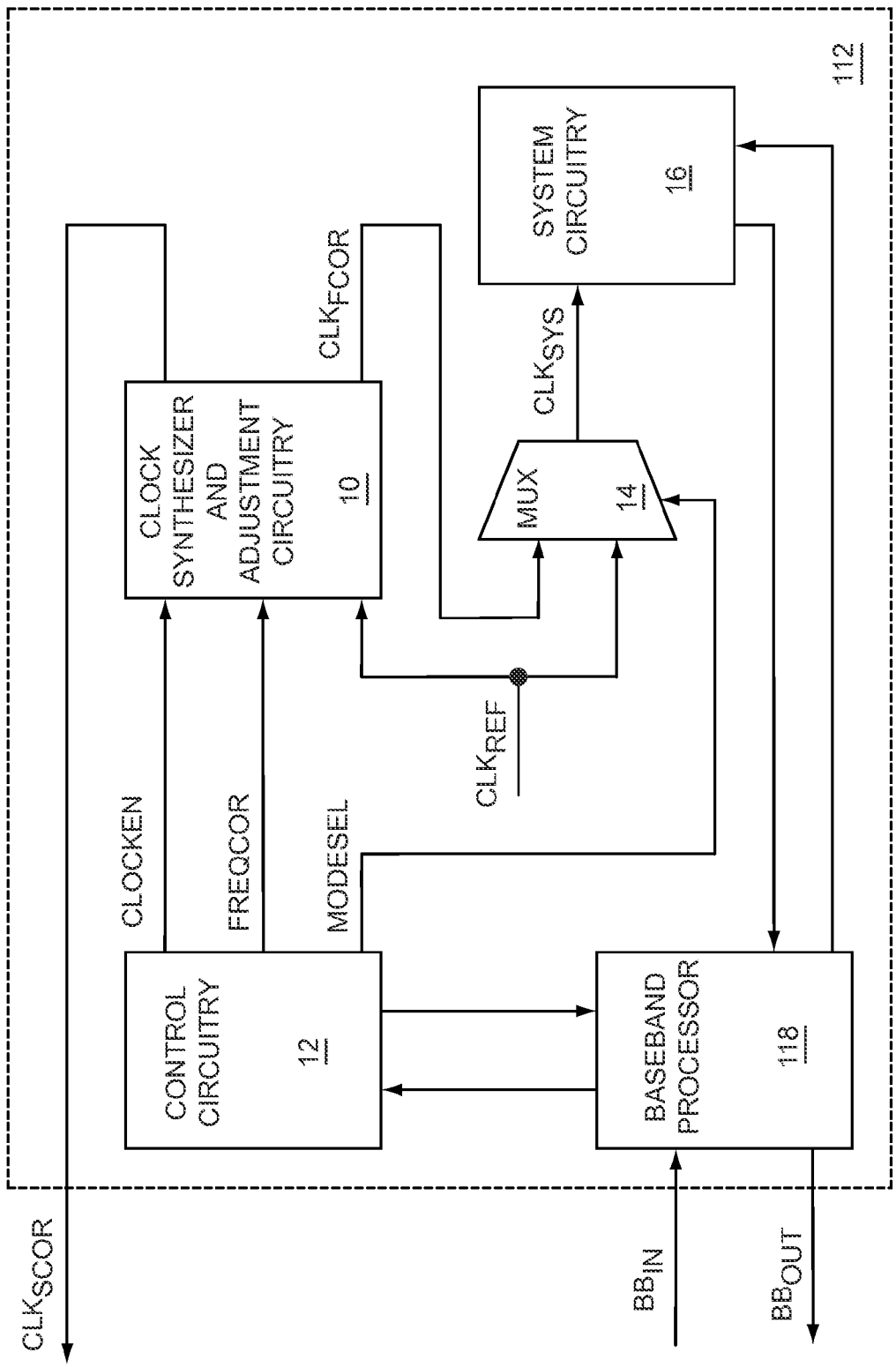

FIG. 25 shows details of the baseband controller illustrated in FIG. 21.

Figure 26:
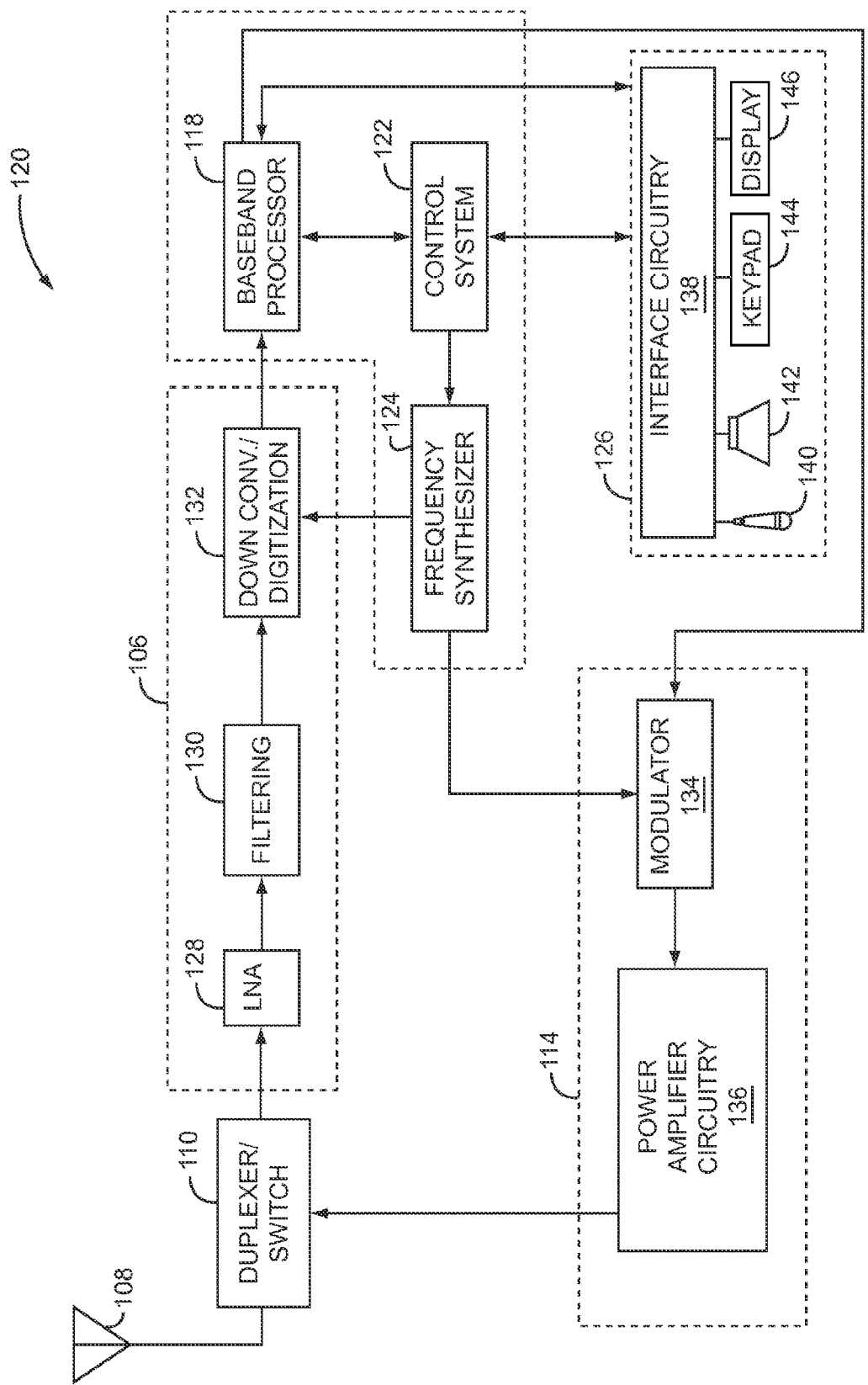

FIG. 26 shows an application example of the present invention used in a mobile terminal.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing a system clock signal that is based on either a first clock signal that is capable of being frequency-corrected or a second clock signal that is not capable of being frequency-corrected, depending on system needs. When the system clock signal is based on the second clock signal, all or part of the circuitry that provides the first clock signal may be disabled or powered-down to reduce power consumption. A multiplexer may be used to select either the first or the second clock signal to provide the system clock signal to system circuitry. The system circuitry may be intolerant of phase-jumps in the system clock signal; therefore, before the multiplexer transitions between the first and the second clock signals, the first clock signal may be phase-adjusted to bring it into phase-alignment with the second clock signal, which may minimize phase-jumps in the system clock signal.

Clock synthesizer and adjustment circuitry synthesizes the first clock signal based on a reference clock signal that is also used to provide the second clock signal. The clock synthesizer and adjustment circuitry may apply a frequency correction to the first clock signal based on a frequency correction signal. The first clock signal may then be used for applications requiring frequency correction. One embodiment of the present invention begins with the multiplexer providing the system clock signal based on the second clock signal when the first clock signal is disabled. Then, in order to support an application requiring frequency correction, the first clock signal is enabled and phase-aligned with the second clock signal. The multiplexer transitions to provide the system clock signal based on the first clock signal. The frequency correction signal may be adjusted to provide appropriate frequency correction to the first clock signal. When frequency correction is no longer needed, the first clock signal may be phase-aligned with the second clock signal, and the multiplexer may transition to provide the system clock signal based on the second clock signal. Next, the first clock signal may be disabled to save power, reduce noise, or the like.

In a first embodiment of the present invention, the frequency correction signal may be adjusted to apply no frequency correction to the first clock signal, such that the frequency and phase of the first clock signal is about equal to the frequency and phase of the second clock signal. Next, the multiplexer may transition between the first and the second clock signals. In a second embodiment of the present invention, the clock synthesizer and adjustment circuitry may include a phase-locked loop (PLL) having a feedback divider circuit and a divide value dither circuit, which is used to dither the divide value of the feedback divider circuit to apply a frequency correction to the first clock signal. In addition to providing any needed frequency correction, the divide value dither circuit may be used to phase-adjust the first clock signal before multiplexer transitioning. In a third embodiment of the present invention, the clock synthesizer and adjustment circuitry may include a programmable delay circuit in series with the output of the PLL. The programmable delay circuit may be used to phase-adjust the first clock signal before multiplexer transitioning.

Figure 1:
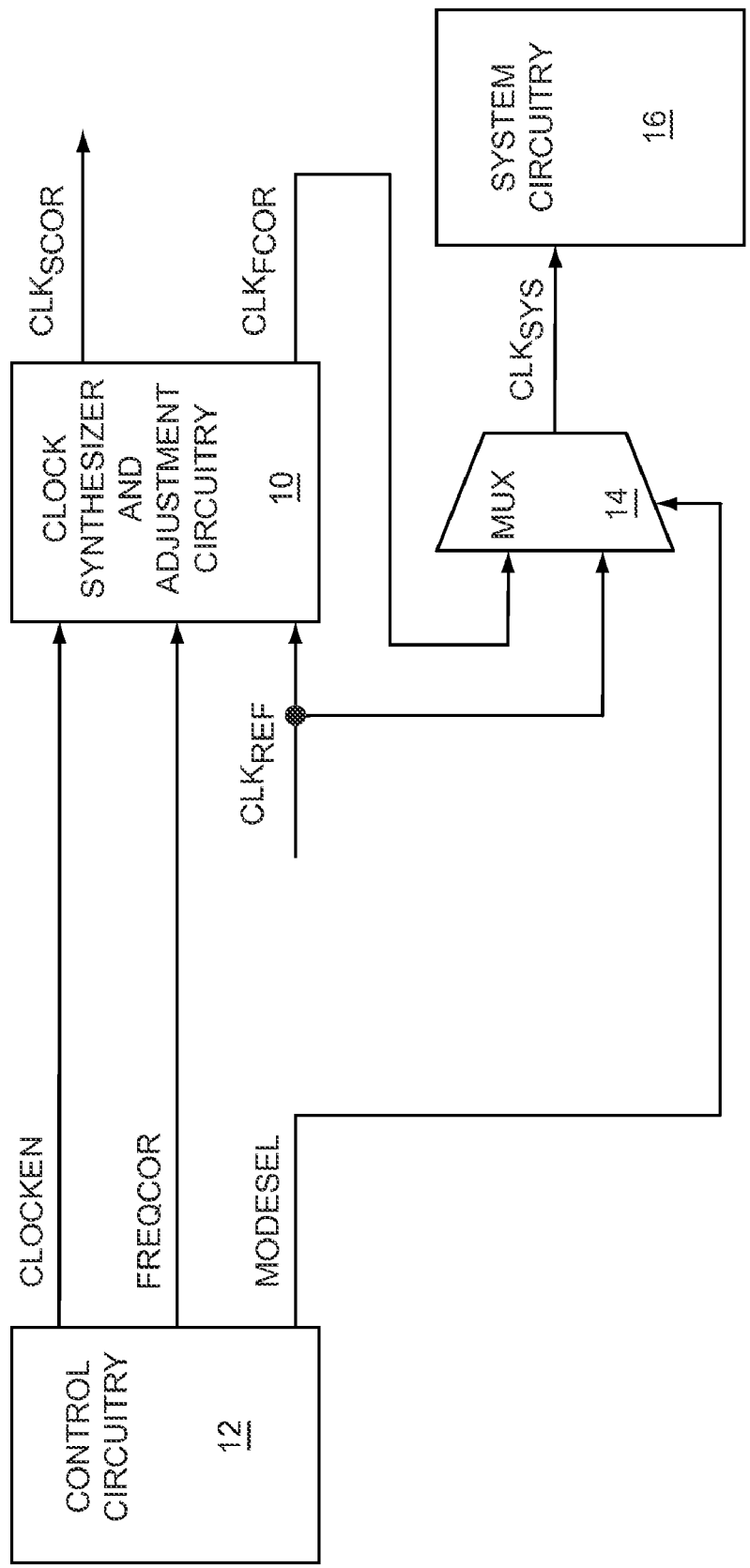

FIG. 1 shows clock synthesizer and adjustment circuitry 10, control circuitry 12, and a multiplexer 14 providing a system clock signal $CLK_{SYS}$ to system circuitry 16, according to one embodiment of the present invention. The clock synthesizer and adjustment circuitry 10 receives a reference clock signal $CLK_{REF}$, which provides the second clock signal mentioned in the previous paragraph, and synthesizes a first frequency-corrected clock signal $CLK_{FCOR}$ and a second frequency-corrected clock signal $CLK_{SCOR}$ using the reference clock signal $CLK_{REF}$. At any given moment, the first and second frequency-corrected clock signals $CLK_{FCOR}$, $CLK_{SCOR}$ may or may not have an applied frequency correction, depending on specific system operations. The second frequency-corrected clock signal $CLK_{SCOR}$ may be used for communications related functions, such as a local oscillator signal in a transmitter or receiver, whereas the first frequency-corrected clock signal $CLK_{FCOR}$ is typically at a lower frequency and used to provide the system clock signal $CLK_{SYS}$ under certain conditions. The frequency of the second frequency-corrected clock signal $CLK_{SCOR}$ with no applied frequency correction is typically an integer or integer fraction multiple of the frequency of the reference clock signal $CLK_{REF}$. An integer fraction is one integer divided by another integer. The frequency of the first frequency-corrected clock signal $CLK_{FCOR}$ with no applied frequency correction is typically about equal to the frequency of the reference clock signal $CLK_{REF}$. Additionally, the clock synthesizer and adjustment circuitry 10 may apply a frequency correction, which is based on a frequency correction signal FREQCOR, to the first frequency-corrected clock signal $CLK_{FCOR}$. The control circuitry 12 provides the clock synthesizer and adjustment circuitry 10 with the frequency correction signal FREQCOR and a clock enable signal CLOCKEN, which is used to enable or disable the first and second frequency-corrected clock signals $CLK_{FCOR}$, $CLK_{SCOR}$, depending on system needs. Disabling the first and second frequency-corrected clock signals $CLK_{FCOR}$, $CLK_{SCOR}$ may reduce noise, power consumption, or both, which may be particularly beneficial for battery-powered devices.

In some applications, the system clock signal $CLK_{SYS}$ may be needed regardless of whether the first frequency-corrected clock signal $CLK_{FCOR}$ is enabled or disabled; however, in certain situations the system clock signal $CLK_{SYS}$ may need to be based on the first frequency-corrected clock signal $CLK_{FCOR}$ when enabled. Therefore, the system clock signal $CLK_{SYS}$ is provided by the multiplexer 14, which selects either the first frequency-corrected clock signal $CLK_{FCOR}$ or the reference clock signal $CLK_{REF}$ to provide the system clock signal $CLK_{SYS}$ based on a mode selection signal MODESEL. The control circuitry 12 provides the mode selection signal MODESEL to the multiplexer 14.

The system circuitry 16 may be intolerant of significant phase jumps when transitioning between the first frequency-corrected clock signal $CLK_{FCOR}$ and the reference clock signal $CLK_{REF}$; therefore, the first frequency-corrected clock signal $CLK_{FCOR}$ may need to be substantially phase-aligned with the reference clock signal $CLK_{REF}$ during such a transition. In an exemplary embodiment of the present invention, the phase of the first frequency-corrected clock signal $CLK_{FCOR}$ must be within about 30 degrees of the phase of the reference clock signal $CLK_{REF}$ during a transition between the first frequency-corrected clock signal $CLK_{FCOR}$ and the reference clock signal $CLK_{REF}$. At the time of transition, the frequency of the first frequency-corrected clock signal $CLK_{FCOR}$ may differ from the frequency of the reference clock signal $CLK_{REF}$ due to frequency correction of the first frequency-corrected clock signal $CLK_{FCOR}$; however, in many systems, such a frequency difference is acceptable as long as phase-jump restrictions are met.

FIGS. 2A, 2B, 2C, 2D, 2E, and 2F are graphs showing timing relationships between the frequency correction signal FREQCOR, the mode selection signal MODESEL, the clock enable signal CLOCKEN, the first frequency-corrected clock signal $CLK_{FCOR}$, the reference clock signal $CLK_{REF}$, and the system clock signal $CLK_{SYS}$, respectively, related to the circuitry illustrated in FIG. 1, according to one embodiment of the present invention. Each of the frequency correction signal FREQCOR, the mode selection signal MODESEL, the clock enable signal CLOCKEN, and the first frequency-corrected clock signal $CLK_{FCOR}$ starts out with a magnitude of zero, which corresponds to no applied frequency correction, the system clock signal $CLK_{SYS}$ is based on the reference clock signal $CLK_{REF}$, the first frequency-corrected clock signal $CLK_{FCOR}$ being disabled, and the first frequency-corrected clock signal $CLK_{FCOR}$ is not transitioning, respectively. The system clock signal $CLK_{SYS}$ and the reference clock signal $CLK_{REF}$ are both active and functioning normally.

Next, the clock enable signal CLOCKEN transitions from a disabled state to an enabled state, which enables the first frequency-corrected clock signal $CLK_{FCOR}$. Since the magnitude of the frequency correction signal FREQCOR is zero, no frequency correction is applied to the first frequency-corrected clock signal $CLK_{FCOR}$, which causes the first frequency-corrected clock signal $CLK_{FCOR}$ to be about equal in frequency and about phase-aligned with the reference clock signal $CLK_{REF}$. Therefore, when the mode selection signal MODESEL transitions from a magnitude of zero to select the system clock signal $CLK_{SYS}$ based on the first frequency-corrected clock signal $CLK_{FCOR}$ instead of the reference clock signal $CLK_{REF}$, the system clock signal $CLK_{SYS}$ does not change significantly.

After selecting the system clock signal $CLK_{SYS}$ to be based on the first frequency-corrected clock signal $CLK_{FCOR}$, the frequency correction signal FREQCOR may change to frequency-correct the first frequency-corrected clock signal $CLK_{FCOR}$ as needed. When the first frequency-corrected clock signal $CLK_{FCOR}$ and the reference clock signal $CLK_{REF}$ have different frequencies that are not integer multiples of each other, the phase of the first frequency-corrected clock signal $CLK_{FCOR}$ will continuously shift with respect to the phase of the reference clock signal $CLK_{REF}$.

Figure 2:
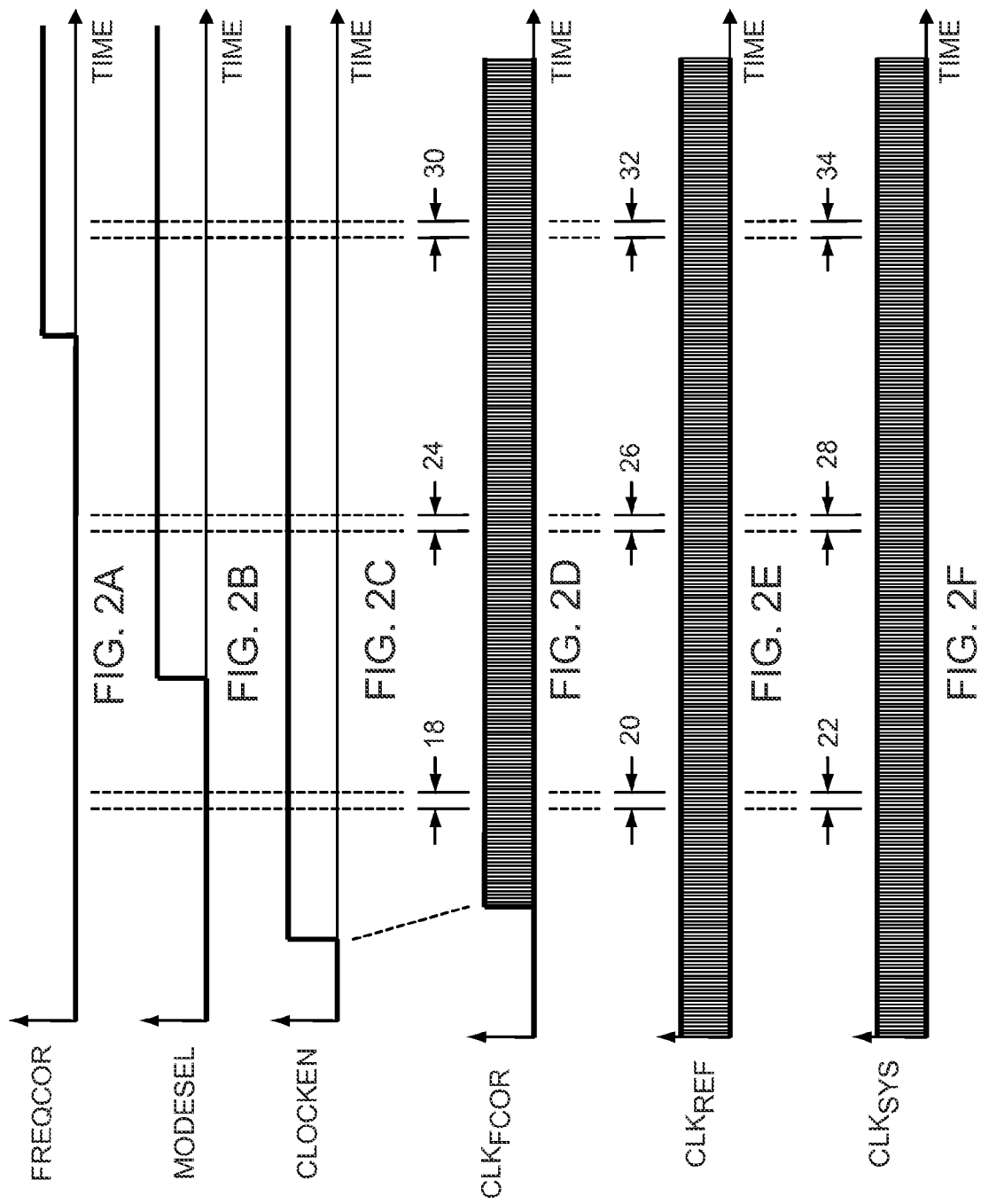

Under the conditions of no applied frequency correction as shown in FIG. 2A, the system clock signal $CLK_{SYS}$ is based on the reference clock signal $CLK_{REF}$ as shown in FIG. 2B, and the first frequency-corrected clock signal $CLK_{FCOR}$ is enabled as shown in FIG. 2C, a first corrected clock sample 18 is sampled from the first frequency-corrected clock signal $CLK_{FCOR}$, a first reference clock sample 20 is sampled from the reference clock signal $CLK_{REF}$, and a first system clock sample 22 is sampled from the system clock signal $CLK_{SYS}$, as shown in FIGS. 2D, 2E, and 2F, respectively. The first samples 18, 20, 22 are sampled simultaneously.

Under the conditions of no applied frequency correction as shown in FIG. 2A, the system clock signal $CLK_{SYS}$ is based on the first frequency-corrected clock signal $CLK_{FCOR}$ as shown in FIG. 2B, and the first frequency-corrected clock signal $CLK_{FCOR}$ is enabled as shown in FIG. 2C, a second corrected clock sample 24 is sampled from the first frequency-corrected clock signal $CLK_{FCOR}$, a second reference clock sample 26 is sampled from the reference clock signal $CLK_{REF}$, and a second system clock sample 28 is sampled from the system clock signal $CLK_{SYS}$, as shown in FIGS. 2D, 2E, and 2F, respectively. The second samples 24, 26, 28 are sampled simultaneously.

Under the conditions of applied frequency correction as shown in FIG. 2A, the system clock signal $CLK_{SYS}$ is based on the first frequency-corrected clock signal $CLK_{FCOR}$ as shown in FIG. 2B, and the first frequency-corrected clock signal $CLK_{FCOR}$ is enabled as shown in FIG. 2C, a third corrected clock sample 30 is sampled from the first frequency-corrected clock signal $CLK_{FCOR}$, a third reference clock sample 32 is sampled from the reference clock signal $CLK_{REF}$, and a third system clock sample 34 is sampled from the system clock signal $CLK_{SYS}$, as shown in FIGS. 2D, 2E, and 2F, respectively. The third samples 30, 32, 34 are sampled simultaneously.

Alternate embodiments of the present invention may use other magnitudes of the frequency correction signal FREQCOR, may use one or more additional signals, or both, to represent applied frequency correction or no applied frequency correction in which the first frequency-corrected clock signal $CLK_{FCOR}$ is about equal in frequency and about phase-aligned with the reference clock signal $CLK_{REF}$. In an additional embodiment of the present invention, when no frequency correction is applied, the first frequency-corrected clock signal $CLK_{FCOR}$ is about equal to an integer multiple in frequency and is about phase-aligned with the reference clock signal $CLK_{REF}$. Alternate embodiments of the present invention may use other magnitudes of the mode selection signal MODESEL to select which of the first frequency-corrected clock signal $CLK_{FCOR}$ and the reference clock signal $CLK_{REF}$ is to be used to provide the system clock signal $CLK_{SYS}$. Alternate embodiments of the present invention may use other magnitudes of the clock enable signal CLOCKEN to represent the enabled and disabled states.

Figure 3:
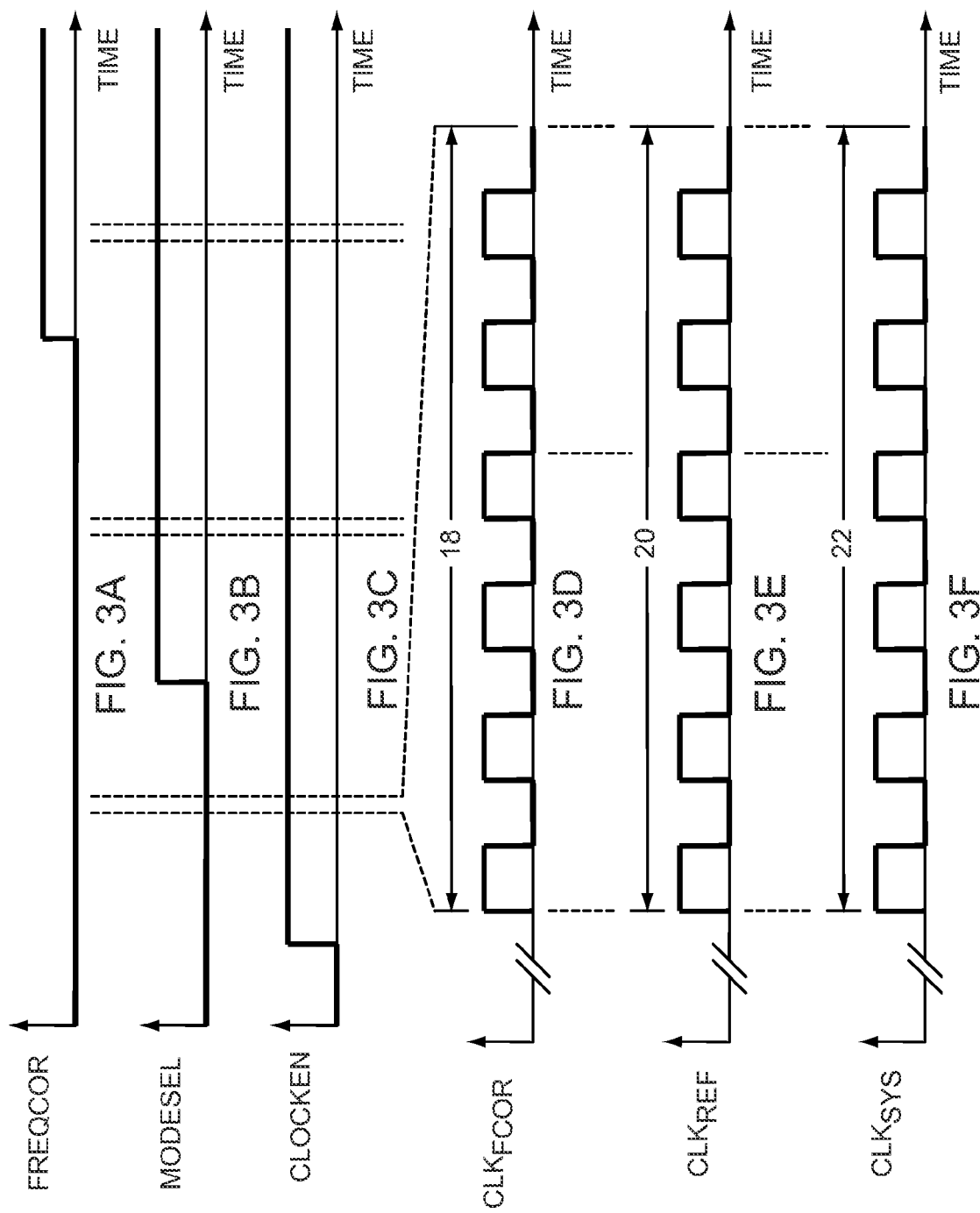

FIGS. 3A, 3B, 3C, 3D, 3E, and 3F are graphs showing timing relationships between the frequency correction signal FREQCOR, the mode selection signal MODESEL, the clock enable signal CLOCKEN, and details of the first frequency-corrected clock signal $CLK_{FCOR}$, the reference clock signal $CLK_{REF}$, and the system clock signal $CLK_{SYS}$, respectively, illustrated in FIGS. 2A, 2B, 2C, 2D, 2E, and 2F. FIGS. 3A, 3B, and 3C are equivalent to FIGS. 2A, 2B, and 2C, respectively, and are shown for clarification. Under the conditions of no applied frequency correction as shown in FIG. 3A, the system clock signal $CLK_{SYS}$ is based on the reference clock signal $CLK_{REF}$ as shown in FIG. 3B, and the first frequency-corrected clock signal $CLK_{FCOR}$ is enabled as shown in FIG. 3C, the first samples 18, 20, 22 show that the first frequency-corrected clock signal $CLK_{FCOR}$ is phase-aligned with the reference clock signal $CLK_{REF}$ and the system clock signal $CLK_{SYS}$, as shown in FIGS. 3D, 3E, and 3F, respectively. Therefore, the mode selection signal MODESEL can transition without significant disruption of the system clock signal $CLK_{SYS}$.

Figure 4:
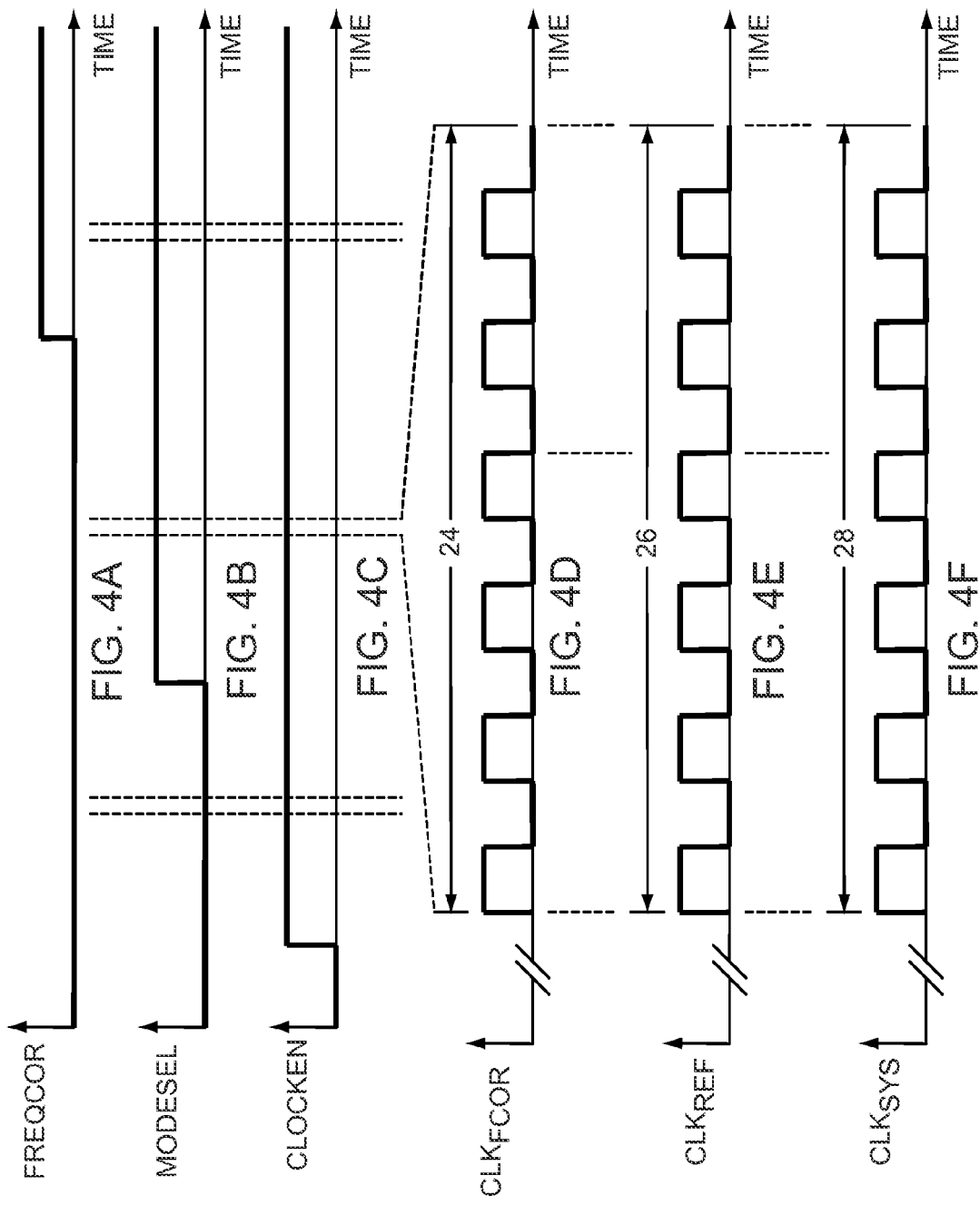

FIGS. 4A, 4B, 4C, 4D, 4E, and 4F are graphs showing timing relationships between the frequency correction signal FREQCOR, the mode selection signal MODESEL, the clock enable signal CLOCKEN, and additional details of the first frequency-corrected clock signal $CLK_{FCOR}$, the reference clock signal $CLK_{REF}$, and the system clock signal $CLK_{SYS}$, respectively, illustrated in FIGS. 2A, 2B, 2C, 2D, 2E, and 2F. FIGS. 4A, 4B, and 4C are equivalent to FIGS. 2A, 2B, and 2C, respectively, and are shown for clarification. Under the conditions of no applied frequency correction as shown in FIG. 4A, the mode selection signal MODESEL has transitioned such that the system clock signal $CLK_{SYS}$ is now based on the first frequency-corrected clock signal $CLK_{FCOR}$ as shown in FIG. 4B, and the first frequency-corrected clock signal $CLK_{FCOR}$ is enabled as shown in FIG. 4C, the second samples 24, 26, 28 show that the first frequency-corrected clock signal $CLK_{FCOR}$ is still phase-aligned with the reference clock signal $CLK_{REF}$ and the system clock signal $CLK_{SYS}$, as shown in FIGS. 4D, 4E, and 4F, respectively. However, since the system clock signal $CLK_{SYS}$ is now based on the first frequency-corrected clock signal $CLK_{FCOR}$, the frequency correction signal FREQCOR can change to apply frequency corrections without causing phase-jumps of the system clock signal $CLK_{SYS}$.

Figure 5:
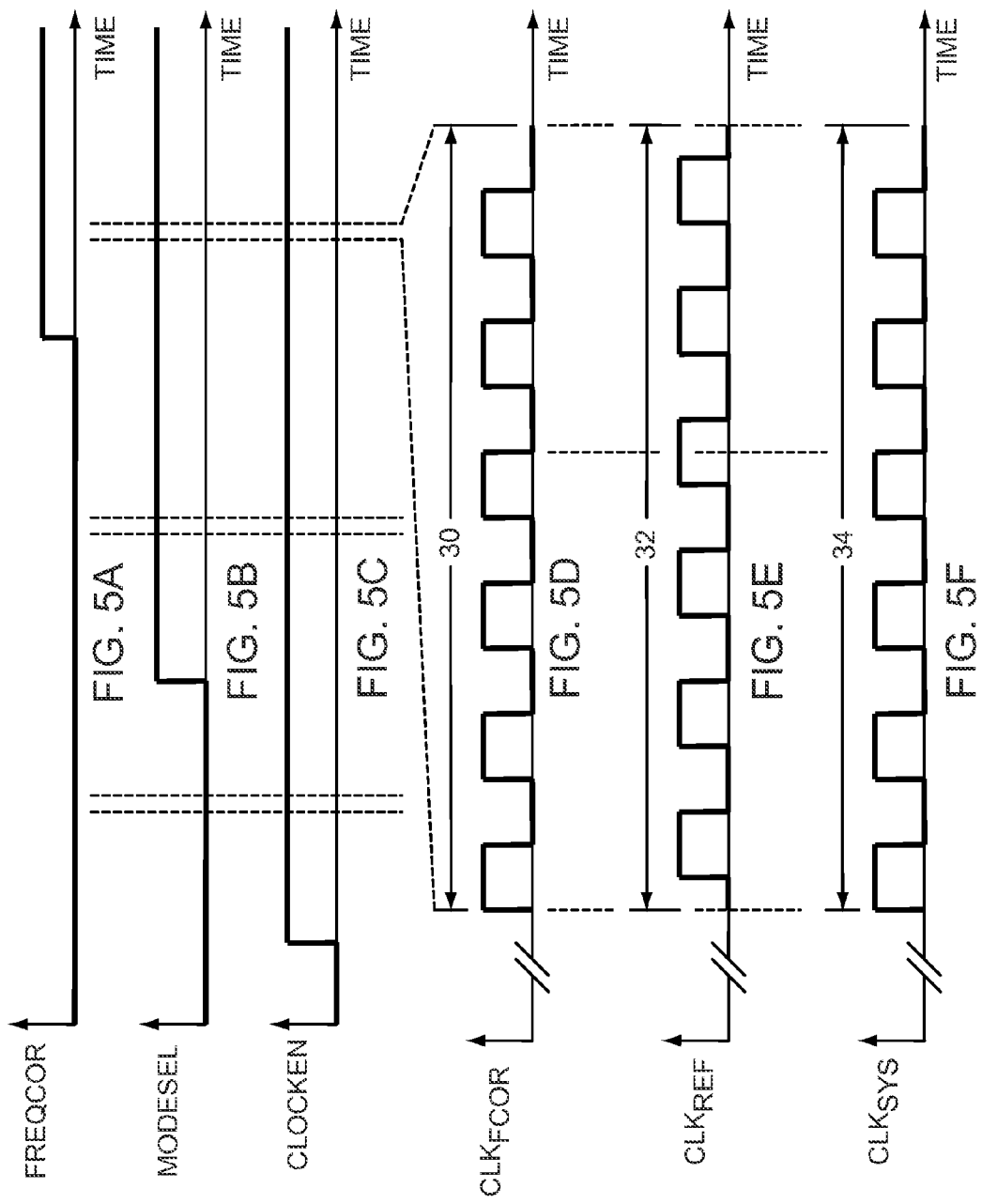

FIGS. 5A, 5B, 5C, 5D, 5E, and 5F are graphs showing timing relationships between the frequency correction signal FREQCOR, the mode selection signal MODESEL, the clock enable signal CLOCKEN, and other details of the first frequency-corrected clock signal $CLK_{FCOR}$, the reference clock signal $CLK_{REF}$, and the system clock signal $CLK_{SYS}$, respectively, illustrated in FIGS. 2A, 2B, 2C, 2D, 2E, and 2F. FIGS. 5A, 5B, and 5C are equivalent to FIGS. 2A, 2B, and 2C, respectively, and are shown for clarification. Under the conditions wherein the frequency correction signal FREQCOR has transitioned to apply frequency correction as shown in FIG. 5A, the system clock signal $CLK_{SYS}$ is based on the first frequency-corrected clock signal $CLK_{FCOR}$ as shown in FIG. 5B, and the first frequency-corrected clock signal $CLK_{FCOR}$ is enabled as shown in FIG. 5C, the third corrected clock sample 30 and the third system clock sample 34 show that the first frequency-corrected clock signal $CLK_{FCOR}$ is still phase-aligned with the system clock signal $CLK_{SYS}$, as shown in FIGS. 5D and 5F, respectively. This is expected since the system clock signal $CLK_{SYS}$ is based on the first frequency-corrected clock signal $CLK_{FCOR}$.

However, since the frequency correction signal FREQCOR is applying frequency-correction to the first frequency-corrected clock signal $CLK_{FCOR}$, the first frequency-corrected clock signal $CLK_{FCOR}$ and the reference clock signal $CLK_{REF}$ have different frequencies; therefore, the phase of the first frequency-corrected clock signal $CLK_{FCOR}$ will continuously shift with respect to the phase of the reference clock signal $CLK_{REF}$. The third corrected clock sample 30 and the third reference clock sample 32 show the first frequency-corrected clock signal $CLK_{FCOR}$ phase-shifted from the reference clock signal $CLK_{REF}$, as illustrated in FIGS. 5D and 5E, respectively. However, since the system clock signal $CLK_{SYS}$ is based on the first frequency-corrected clock signal $CLK_{FCOR}$, the phase relationship to the reference clock signal $CLK_{REF}$ has no significant impact on the system clock signal $CLK_{SYS}$.

FIGS. 6A, 6B, 6C, 6D, 6E, and 6F are graphs showing additional timing relationships between the frequency correction signal FREQCOR, the mode selection signal MODESEL, the clock enable signal CLOCKEN, the first frequency-corrected clock signal $CLK_{FCOR}$, the reference clock signal $CLK_{REF}$, and the system clock signal $CLK_{SYS}$, respectively, related to the circuitry illustrated in FIG. 1, according to one embodiment of the present invention. Each of the frequency correction signal FREQCOR, the mode selection signal MODESEL, and the clock enable signal CLOCKEN starts out with a non-zero magnitude, which corresponds to applied frequency correction, the system clock signal $CLK_{SYS}$ is based on the first frequency-corrected clock signal $CLK_{FCOR}$, and the first frequency-corrected clock signal $CLK_{FCOR}$ being enabled, respectively. The first frequency-corrected clock signal $CLK_{FCOR}$, the reference clock signal $CLK_{REF}$, and the system clock signal $CLK_{SYS}$ are active and functioning normally.

When operations requiring frequency-corrected clocks are completed, it may be desirable to disable the first and second frequency-corrected clock signals $CLK_{FCOR}$, $CLK_{SCOR}$ to conserve power, reduce noise, or for other reasons. Several steps are taken to disable the first and second frequency-corrected clock signals $CLK_{FCOR}$, $CLK_{SCOR}$. The magnitude of the frequency correction signal FREQCOR is changed to zero, which causes no frequency correction to be applied to the first frequency-corrected clock signal $CLK_{FCOR}$, and causes the first frequency-corrected clock signal $CLK_{FCOR}$ to be about equal in frequency and about phase-aligned with the reference clock signal $CLK_{REF}$. Next, the mode selection signal MODESEL transitions to a magnitude of zero to select the system clock signal $CLK_{SYS}$ based on the reference clock signal $CLK_{REF}$ instead of the first frequency-corrected clock signal $CLK_{FCOR}$, which does not cause any phase-jumps in the system clock signal $CLK_{SYS}$. The clock enable signal CLOCKEN transitions from the enabled state to the disabled state, which drives the magnitude of the first frequency-corrected clock signal $CLK_{FCOR}$ and the second frequency-corrected clock signal $CLK_{SCOR}$ (not shown) to zero.

Figure 6:
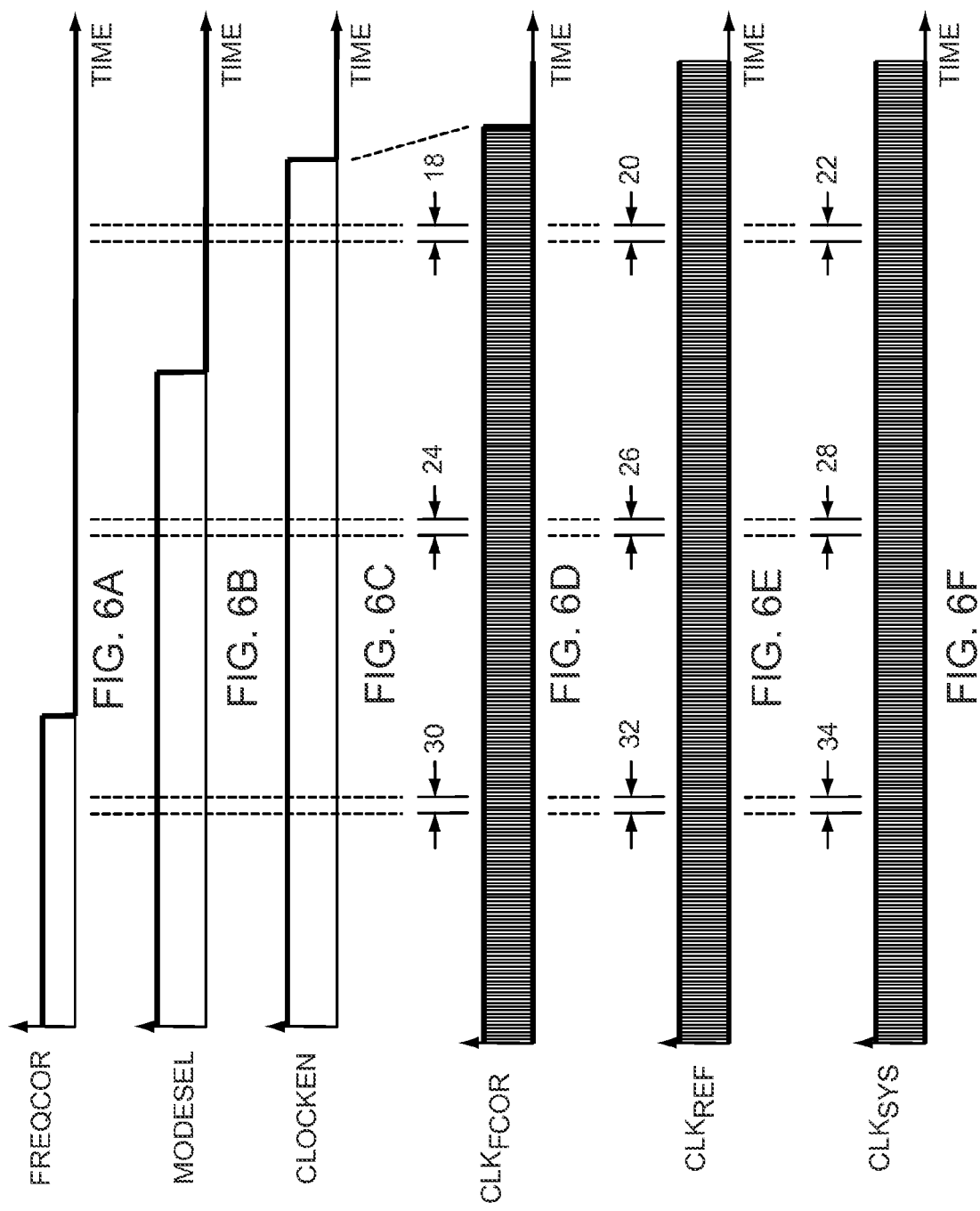

Under the conditions of applied frequency correction as shown in FIG. 6A, the system clock signal $CLK_{SYS}$ is based on the first frequency-corrected clock signal $CLK_{FCOR}$ as shown in FIG. 6B, and the first frequency-corrected clock signal $CLK_{FCOR}$ is enabled as shown in FIG. 6C, another third corrected clock sample 30 is sampled from the first frequency-corrected clock signal $CLK_{FCOR}$, another third reference clock sample 32 is sampled from the reference clock signal $CLK_{REF}$, and another third system clock sample 34 is sampled from the system clock signal $CLK_{SYS}$, as shown in FIGS. 6D, 6E, and 6F, respectively. The third samples 30, 32, 34 are sampled simultaneously.

Under the conditions of no applied frequency correction as shown in FIG. 6A, the system clock signal $CLK_{SYS}$ is based on the first frequency-corrected clock signal $CLK_{FCOR}$ as shown in FIG. 6B, and the first frequency-corrected clock signal $CLK_{FCOR}$ is enabled as shown in FIG. 6C, another second corrected clock sample 24 is sampled from the first frequency-corrected clock signal $CLK_{FCOR}$, another second reference clock sample 26 is sampled from the reference clock signal $CLK_{REF}$, and another second system clock sample 28 is sampled from the system clock signal $CLK_{SYS}$, as shown in FIGS. 6D, 6E, and 6F, respectively. The second samples 24, 26, 28 are sampled simultaneously.

Under the conditions of no applied frequency correction as shown in FIG. 6A, the system clock signal $CLK_{SYS}$ is based on the reference clock signal $CLK_{REF}$ as shown in FIG. 6B, and the first frequency-corrected clock signal $CLK_{FCOR}$ is enabled as shown in FIG. 6C, another first corrected clock sample 18 is sampled from the first frequency-corrected clock signal $CLK_{FCOR}$, another first reference clock sample 20 is sampled from the reference clock signal $CLK_{REF}$, and another first system clock sample 22 is sampled from the system clock signal $CLK_{SYS}$, as shown in FIGS. 6D, 6E, and 6F, respectively. The first samples 18, 20, 22 are sampled simultaneously.

Figure 7:
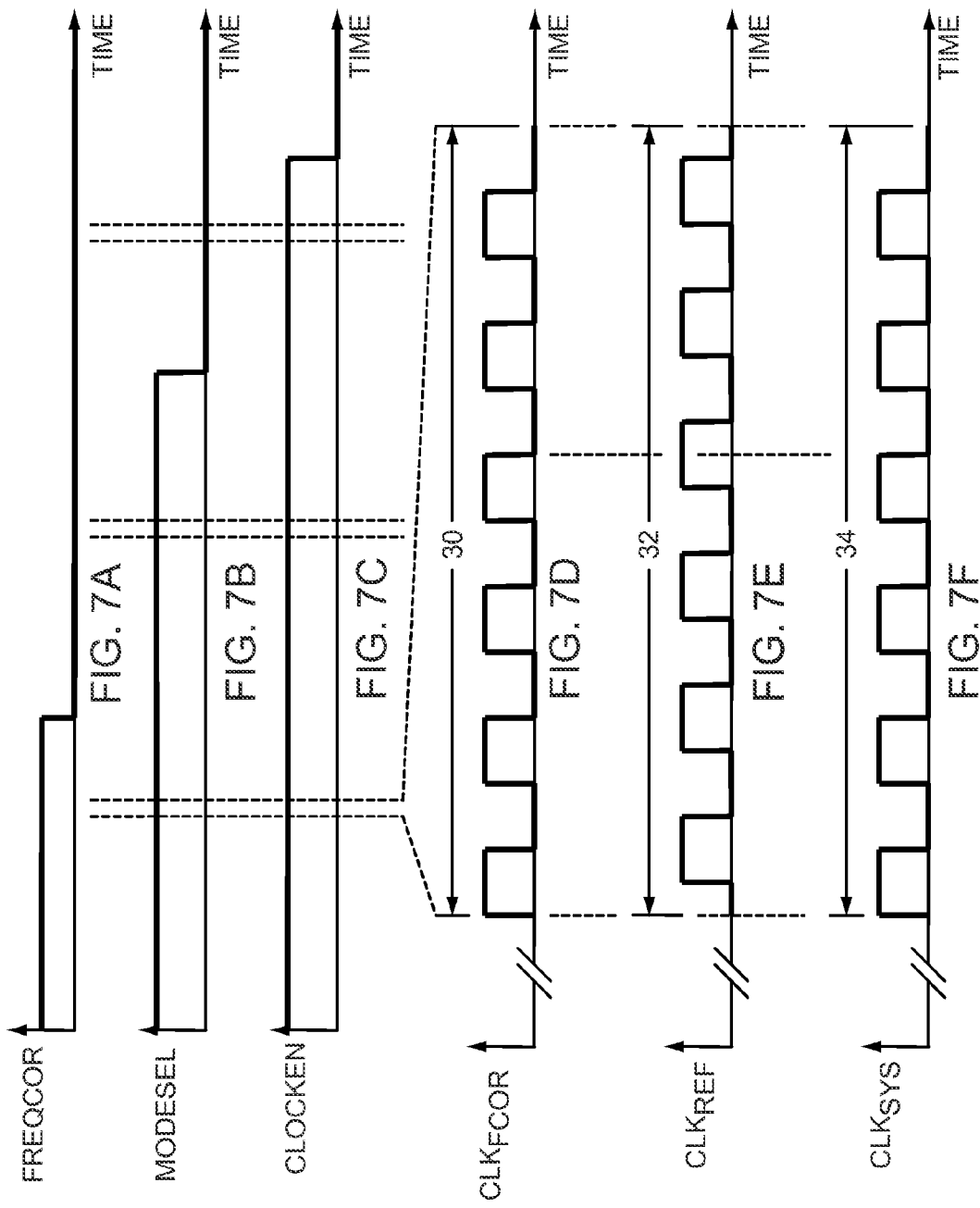

FIGS. 7A, 7B, 7C, 7D, 7E, and 7F are graphs showing timing relationships between the frequency correction signal FREQCOR, the mode selection signal MODESEL, the clock enable signal CLOCKEN, and details of the first frequency-corrected clock signal $CLK_{FCOR}$, the reference clock signal $CLK_{REF}$, and the system clock signal $CLK_{SYS}$, respectively, illustrated in FIGS. 6A, 6B, 6C, 6D, 6E, and 6F. FIGS. 7A, 7B, and 7C are equivalent to FIGS. 6A, 6B, and 6C, respectively, and are shown for clarification. Under the conditions wherein the frequency correction signal FREQCOR causes the application of frequency correction as shown in FIG. 7A, the system clock signal $CLK_{SYS}$ is based on the first frequency-corrected clock signal $CLK_{FCOR}$ as shown in FIG. 7B, and the first frequency-corrected clock signal $CLK_{FCOR}$ is enabled as shown in FIG. 7C, the third corrected clock sample 30 and the third system clock sample 34 show that the first frequency-corrected clock signal $CLK_{FCOR}$ is still phase-aligned with the system clock signal $CLK_{SYS}$, as shown in FIGS. 7D and 7F, respectively. This is expected since the system clock signal $CLK_{SYS}$ is based on the first frequency-corrected clock signal $CLK_{FCOR}$.

However, since the frequency correction signal FREQCOR is applying frequency-correction to the first frequency-corrected clock signal $CLK_{FCOR}$, the first frequency-corrected clock signal $CLK_{FCOR}$ and the reference clock signal $CLK_{REF}$ have different frequencies; therefore, the phase of the first frequency-corrected clock signal $CLK_{FCOR}$ will continuously shift with respect to the phase of the reference clock signal $CLK_{REF}$. The third corrected clock sample 30 and the third reference clock sample 32 show the first frequency-corrected clock signal $CLK_{FCOR}$ phase-shifted from the reference clock signal $CLK_{REF}$, as illustrated in FIGS. 7D and 7E, respectively. However, since the system clock signal $CLK_{SYS}$ is based on the first frequency-corrected clock signal $CLK_{FCOR}$, the phase relationship to the reference clock signal $CLK_{REF}$ has no significant impact on the system clock signal $CLK_{SYS}$.

Figure 8:
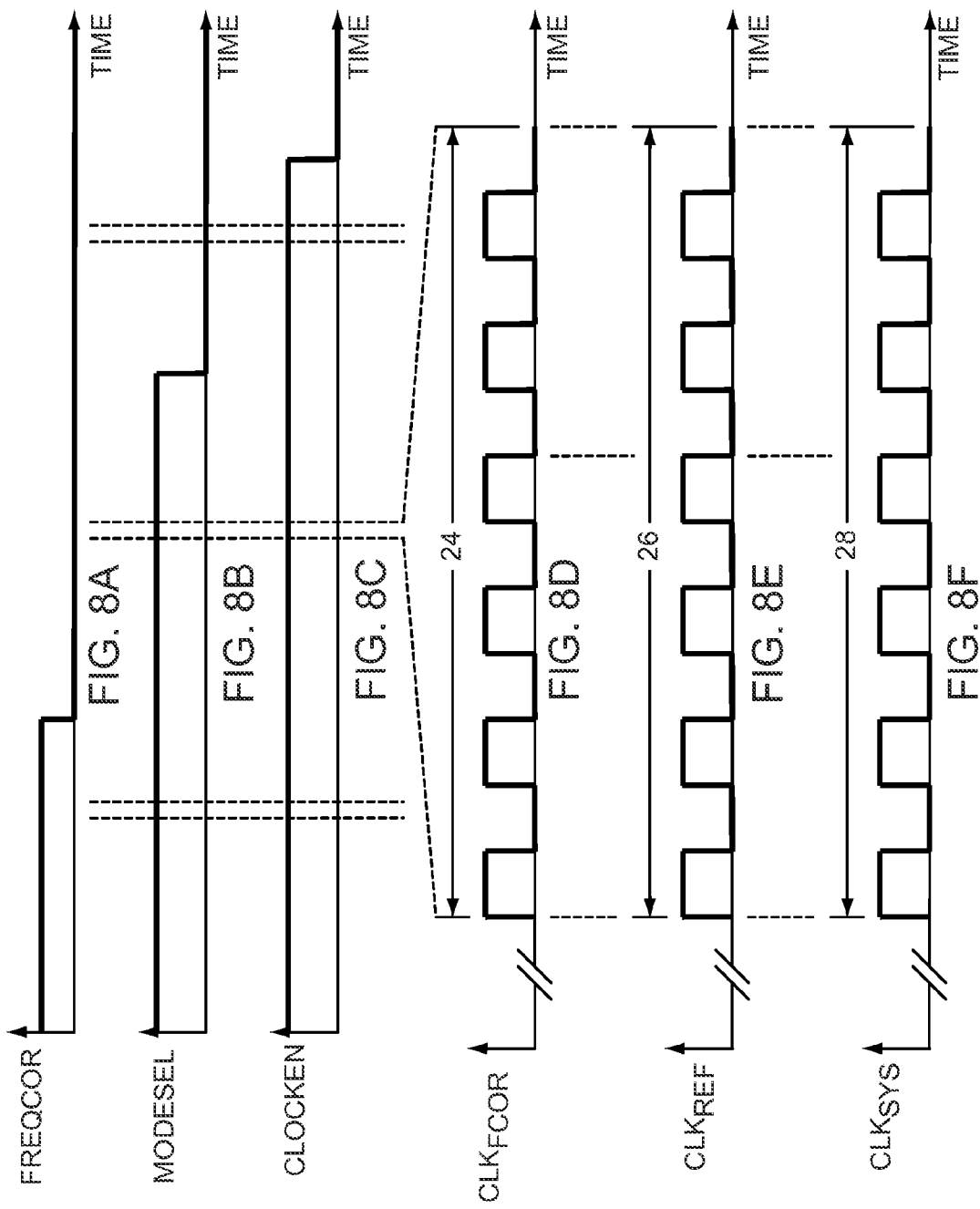

FIGS. 8A, 8B, 8C, 8D, 8E, and 8F are graphs showing timing relationships between the frequency correction signal FREQCOR, the mode selection signal MODESEL, the clock enable signal CLOCKEN, and additional details of the first frequency-corrected clock signal $CLK_{FCOR}$, the reference clock signal $CLK_{REF}$, and the system clock signal $CLK_{SYS}$, respectively, illustrated in FIGS. 6A, 6B, 6C, 6D, 6E, and 6F. FIGS. 8A, 8B, and 8C are equivalent to FIGS. 6A, 6B, and 6C, respectively, and are shown for clarification. Under the conditions wherein the frequency correction signal FREQCOR has transitioned to select no applied frequency correction as shown in FIG. 8A, the system clock signal $CLK_{SYS}$ is based on the first frequency-corrected clock signal $CLK_{FCOR}$ as shown in FIG. 8B, and the first frequency-corrected clock signal $CLK_{FCOR}$ is enabled as shown in FIG. 8C, the second samples 24, 26, 28 show that the first frequency-corrected clock signal $CLK_{FCOR}$, the reference clock signal $CLK_{REF}$, and the system clock signal $CLK_{SYS}$, are all three phase-aligned as shown in FIGS. 8D, 8E, and 8F, respectively.

Figure 9:
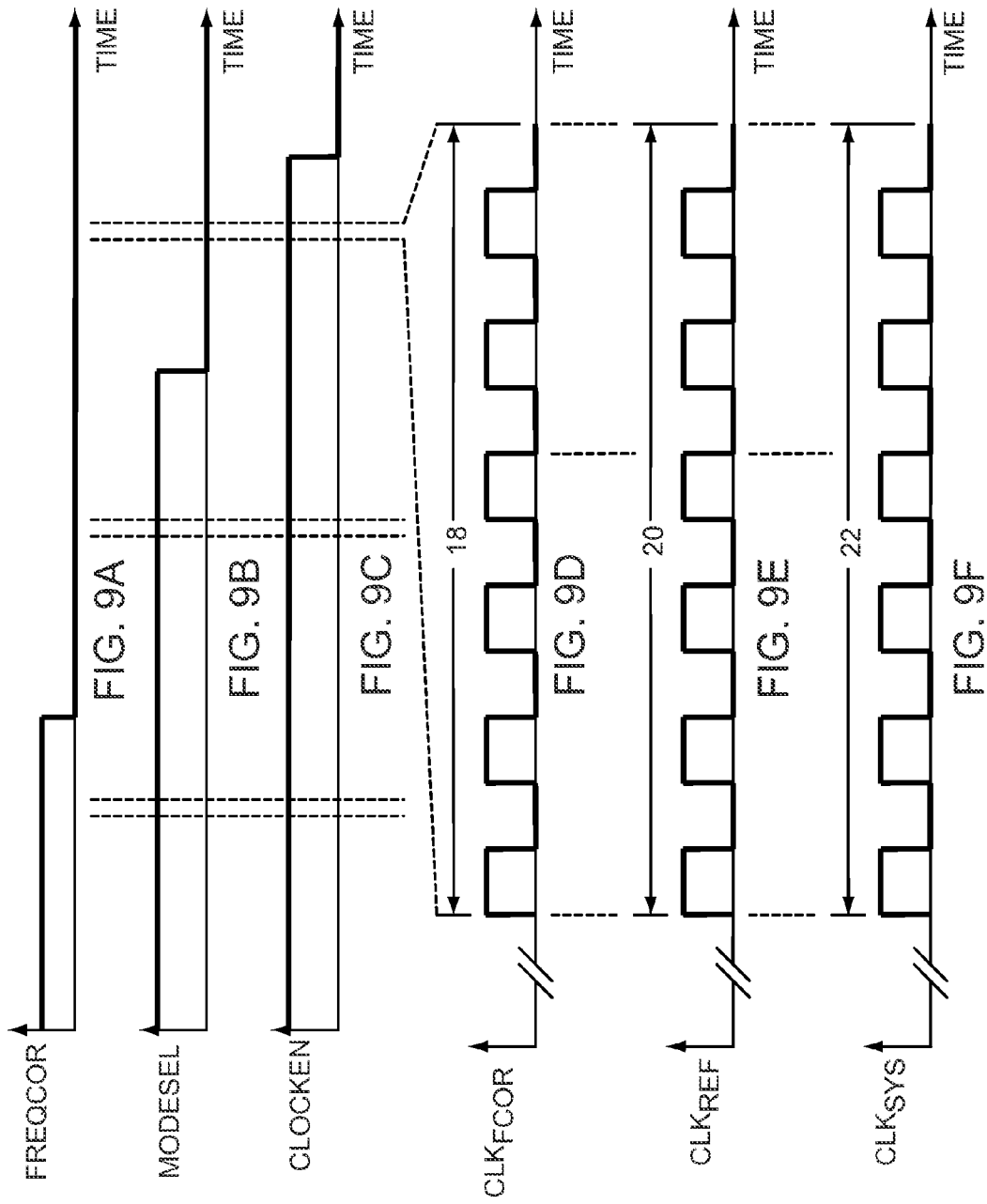

FIGS. 9A, 9B, 9C, 9D, 9E, and 9F are graphs showing timing relationships between the frequency correction signal FREQCOR, the mode selection signal MODESEL, the clock enable signal CLOCKEN, and other details of the first frequency-corrected clock signal $CLK_{FCOR}$, the reference clock signal $CLK_{REF}$, and the system clock signal $CLK_{SYS}$, respectively, illustrated in FIGS. 6A, 6B, 6C, 6D, 6E, and 6F. FIGS. 9A, 9B, and 9C are equivalent to FIGS. 6A, 6B, and 6C, respectively, and are shown for clarification. Under the conditions of no applied frequency correction as shown in FIG. 9A, the mode selection signal MODESEL has transitioned such that the system clock signal $CLK_{SYS}$ is now based on the reference clock signal $CLK_{REF}$ as shown in FIG. 9B, and the first frequency-corrected clock signal $CLK_{FCOR}$ is enabled as shown in FIG. 9C, the first samples 18, 20, 22 show that the first frequency-corrected clock signal $CLK_{FCOR}$, the reference clock signal $CLK_{REF}$, and the system clock signal $CLK_{SYS}$, are all three still phase-aligned as shown in FIGS. 9D, 9E, and 9F, respectively. Since the system clock signal $CLK_{SYS}$ is based on the reference clock signal $CLK_{REF}$, the clock enable signal CLOCKEN can transition to the disabled state without significant disruption of the system clock signal $CLK_{SYS}$.

Figure 10:
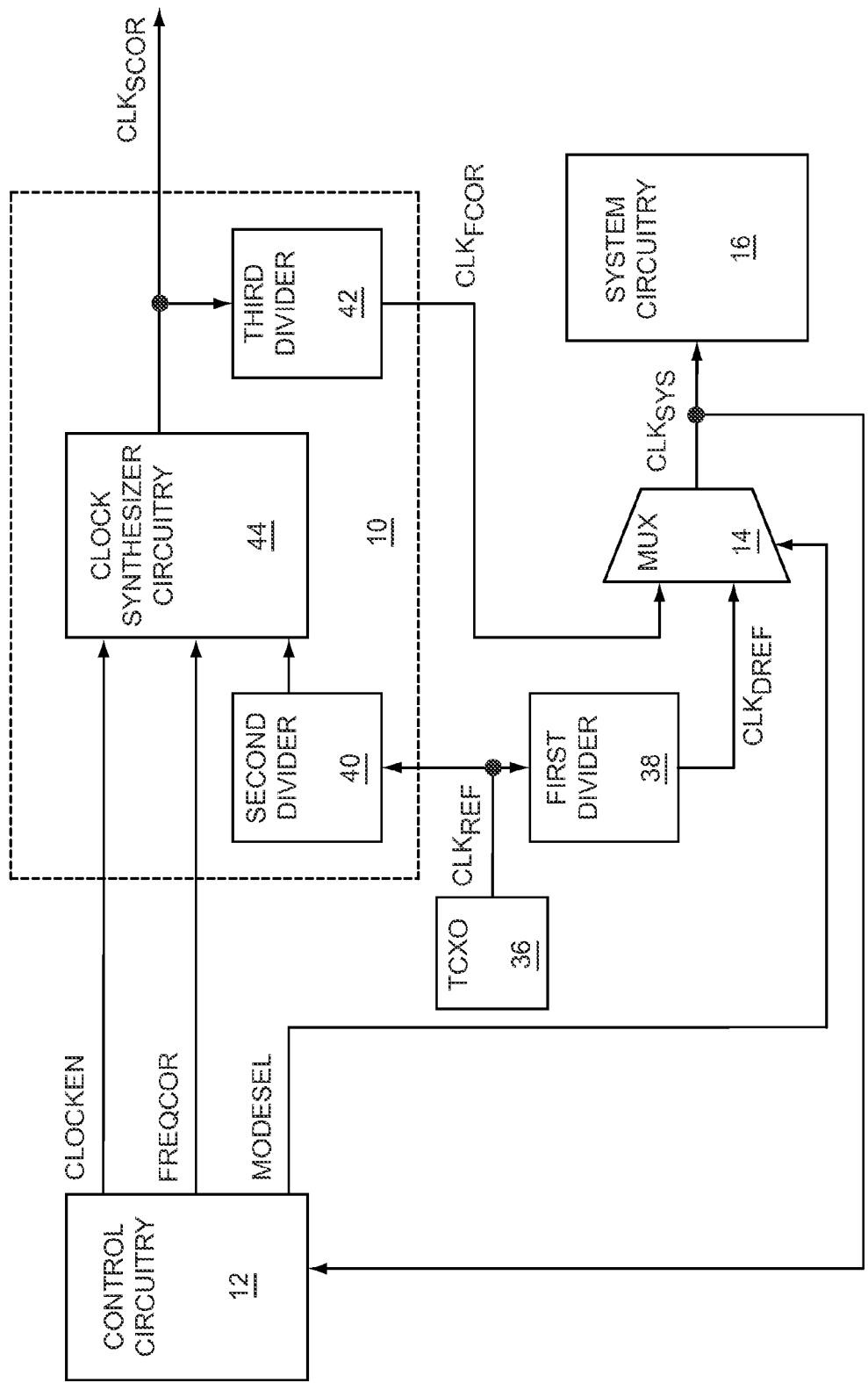
FIG. 10 shows details of the clock synthesizer and adjustment circuitry, the control circuitry, and the multiplexer providing the system clock signal to the system circuitry, according to an alternate embodiment of the present invention.

FIG. 10 shows details of the clock synthesizer and adjustment circuitry 10, the control circuitry 12, and the multiplexer 14 providing the system clock signal $CLK_{SYS}$ to the system circuitry 16, according to an alternate embodiment of the present invention. A temperature-controlled crystal oscillator (TCXO) 36 feeds the reference clock signal $CLK_{REF}$ to a first divider 38, which divides the reference clock signal $CLK_{REF}$ to create a divided reference clock signal $CLK_{DREF}$, which is provided to the multiplexer 14 instead of the reference clock signal $CLK_{REF}$. The clock synthesizer and adjustment circuitry 10 includes a second divider 40, a third divider 42, and clock synthesizer circuitry 44. The TCXO 36 feeds the reference clock signal $CLK_{REF}$ to the clock synthesizer circuitry 44 through the second divider 40. The clock synthesizer circuitry 44 receives the clock enable signal CLOCKEN and the frequency correction signal FREQCOR, and provides the second frequency-corrected clock signal $CLK_{SCOR}$, which is based on the clock enable signal CLOCKEN, the frequency correction signal FREQCOR, and the reference clock signal $CLK_{REF}$ divided by the second divider 40. The third divider 42 receives and divides the second frequency-corrected clock signal $CLK_{SCOR}$ to provide the first frequency-corrected clock signal $CLK_{FCOR}$.

The frequency of the second frequency-corrected clock signal $CLK_{SCOR}$ with no applied frequency correction is typically an integer or integer fraction multiple of the frequency of the reference clock signal $CLK_{REF}$ divided by the second divider 40. An integer fraction is one integer divided by another integer. The frequency of the first frequency-corrected clock signal $CLK_{FCOR}$ with no applied frequency correction is typically about equal to the frequency of the divided reference clock signal $CLK_{DREF}$. Additionally, the clock synthesizer and adjustment circuitry 10 may apply a frequency correction, which is based on the frequency correction signal FREQCOR, to the first and second frequency-corrected clock signals $CLK_{FCOR}$, $CLK_{SCOR}$. The control circuitry 12 provides the frequency correction signal FREQCOR and the clock enable signal CLOCKEN, which is used to enable or disable the first and second frequency-corrected clock signals $CLK_{FCOR}$, $CLK_{SCOR}$, depending on system needs. Disabling the first and second frequency-corrected clock signals $CLK_{FCOR}$, $CLK_{SCOR}$ may reduce noise, power consumption, or both, which may be particularly beneficial for battery-powered devices.

In some applications, the system clock signal $CLK_{SYS}$ may be needed regardless of whether the first frequency-corrected clock signal $CLK_{FCOR}$ is enabled or disabled; however, in certain situations the system clock signal $CLK_{SYS}$ may need to be based on the first frequency-corrected clock signal $CLK_{FCOR}$ when it is enabled. Therefore, the system clock signal $CLK_{SYS}$ is provided by the multiplexer 14, which selects either the first frequency-corrected clock signal $CLK_{FCOR}$ or the divided reference clock signal $CLK_{DREF}$ to provide the system clock signal $CLK_{SYS}$ based on the mode selection signal MODESEL. The control circuitry 12 provides the mode selection signal MODESEL to the multiplexer 14.

The system circuitry 16 may be intolerant of significant phase jumps when transitioning between the first frequency-corrected clock signal $CLK_{FCOR}$ and the divided reference clock signal $CLK_{DREF}$; therefore, the first frequency-corrected clock signal $CLK_{FCOR}$ may need to be substantially phase-aligned with the divided reference clock signal $CLK_{DREF}$ during such a transition. In an exemplary embodiment of the present invention, the phase of the first frequency-corrected clock signal $CLK_{FCOR}$ must be within about 30 degrees of the phase of the divided reference clock signal $CLK_{DREF}$ during a transition between the first frequency-corrected clock signal $CLK_{FCOR}$ and the divided reference clock signal $CLK_{DREF}$. At the time of transition, the frequency of the first frequency-corrected clock signal $CLK_{FCOR}$ may differ from the frequency of the divided reference clock signal $CLK_{DREF}$ due to frequency correction of the first frequency-corrected clock signal $CLK_{FCOR}$; however, in many systems, such a frequency difference is acceptable as long as phase-jump restrictions are met. Other embodiments of the present invention may omit any or all of the first divider 38, the second divider 40, and the third divider 42.

FIG. 11 shows the clock synthesizer and adjustment circuitry 10, the control circuitry 12, and the multiplexer 14 providing the system clock signal $CLK_{SYS}$ to the system circuitry 16, according to an additional embodiment of the present invention. The circuitry illustrated in FIG. 11 is similar to the circuitry illustrated in FIG. 10, except for the removal of the second divider 40 and the addition of a first phase comparator 46, which receives and compares the phases of the first frequency-corrected clock signal $CLK_{FCOR}$ and the divided reference clock signal $CLK_{DREF}$. The first phase comparator 46 provides phase data PHASEDAT based on the phase difference between the first frequency-corrected clock signal $CLK_{FCOR}$ and the divided reference clock signal $CLK_{DREF}$. The phase data PHASEDAT is used by the control circuitry 12 to determine if the phase difference is within acceptable limits for transitioning the mode selection signal MODESEL. The control circuitry 12 provides a phase adjustment signal PHASEADJ to the clock synthesizer circuitry 44, which phase-adjusts the first frequency-corrected clock signal $CLK_{FCOR}$ based on the phase adjustment signal PHASEADJ. If the phase difference between the first frequency-corrected clock signal $CLK_{FCOR}$ and the divided reference clock signal $CLK_{DREF}$ is not within acceptable limits, the phase adjustment signal PHASEADJ is modified to bring the phase difference within acceptable limits.

At the time of transition, the frequency of the first frequency-corrected clock signal $CLK_{FCOR}$ may or may not differ from the frequency of the divided reference clock signal $CLK_{DREF}$ due to frequency correction of the first frequency-corrected clock signal $CLK_{FCOR}$. In an exemplary embodiment of the present invention, the frequency of the reference clock signal $CLK_{REF}$ is equal to about 52 megahertz, the frequency of the divided reference clock signal $CLK_{DREF}$ is equal to about 26 megahertz, the frequency of the first frequency-corrected clock signal $CLK_{FCOR}$ is equal to about 26 megahertz, and the frequency of the second frequency-corrected clock signal $CLK_{SCOR}$ is equal to about 1248 megahertz.

Figure 12:
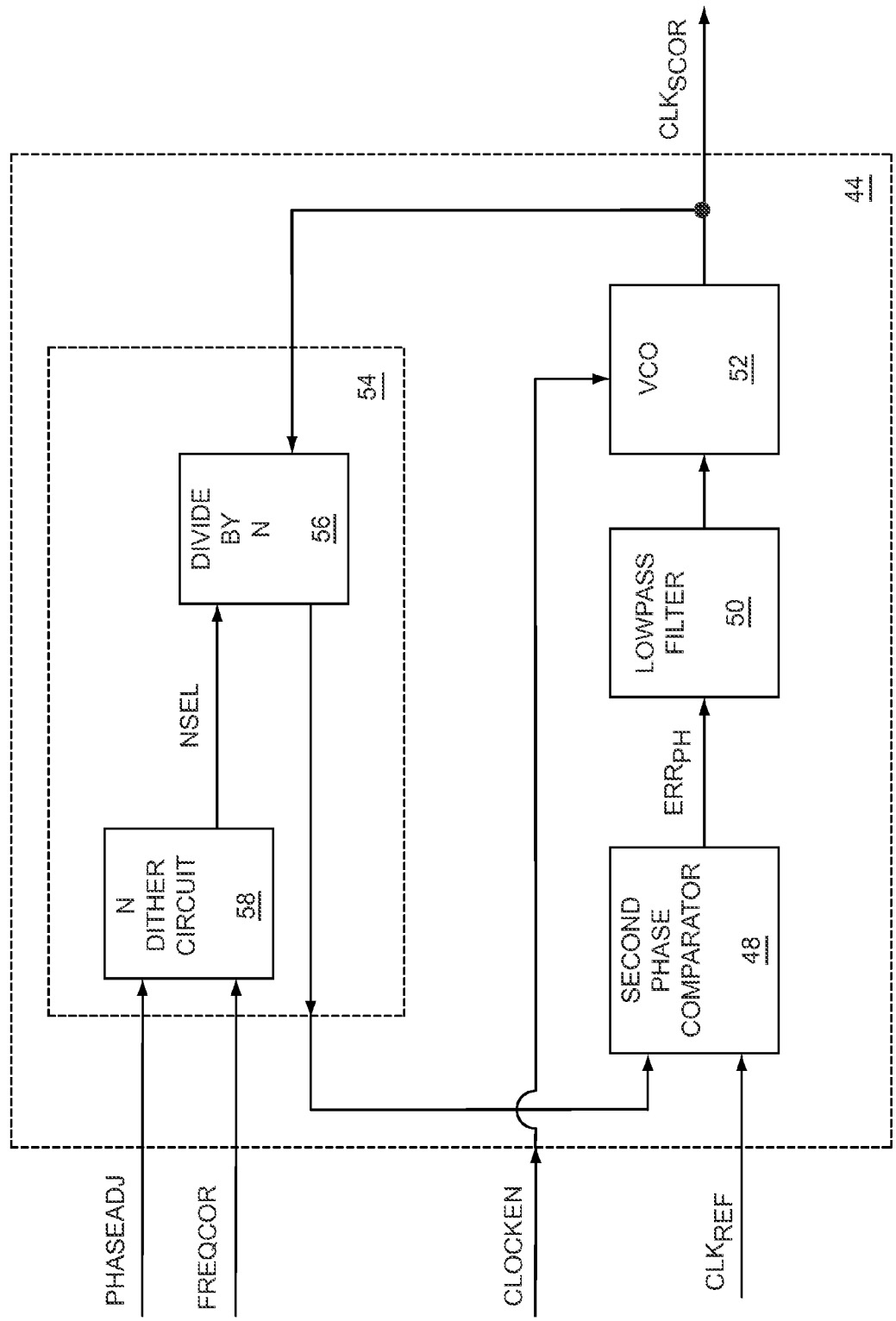
FIG. 12 shows details of the clock synthesizer circuitry, according to one embodiment of the present invention.

FIG. 12 shows details of the clock synthesizer circuitry 44, according to one embodiment of the present invention. The clock synthesizer circuitry 44 includes a second phase comparator 48, a lowpass filter 50, a voltage-controlled oscillator 52, and a fractional divide circuit 54, which includes a divide by N circuit 56 and an N dither circuit 58. The second phase comparator 48, the lowpass filter 50, the voltage-controlled oscillator 52, and the fractional divide circuit 54 form a phase-locked loop. When the clock enable signal CLOCKEN is in the disabled state, any or all of the second phase comparator 48, the lowpass filter 50, the voltage-controlled oscillator 52, and the fractional divide circuit 54 may be powered down to conserve power, reduce noise, or the like. The clock synthesizer circuitry 44 employs feedback and synthesizes the second frequency-corrected clock signal $CLK_{SCOR}$ based on the reference clock signal $CLK_{REF}$, the phase adjustment signal PHASEADJ, the frequency correction signal FREQCOR, and the clock enable signal CLOCKEN. The voltage-controlled oscillator 52 provides the second frequency-corrected clock signal $CLK_{SCOR}$, which is fed back through the fractional divide circuit 54 for comparison with the reference clock signal $CLK_{REF}$.

The second phase comparator 48 receives and compares the phases of the reference clock signal $CLK_{REF}$ and a fractionally-divided second frequency-corrected clock signal to provide a phase error signal $ERR_{PH}$ to the lowpass filter 50. The lowpass filter 50 filters the phase error signal $ERR_{PH}$ to limit the bandwidth of the feedback loop. The lowpass filter 50 provides a filtered phase error signal to the voltage-controlled oscillator 52, which varies its frequency based on the phase error provided by the filtered phase error signal. The filtered phase error signal closes the feedback loop to provide regulation of the frequency of the second frequency-corrected clock signal $CLK_{SCOR}$. The voltage-controlled oscillator 52 is one type of frequency-controlled oscillator. Alternate embodiments of the present invention may use other types of frequency-controlled oscillators in place of the voltage-controlled oscillator 52, such as a digitally-controlled oscillator or a current-controlled oscillator.

The voltage-controlled oscillator 52 enables or disables the second frequency-corrected clock signal $CLK_{SCOR}$ based on the clock enable signal CLOCKEN. The divide by N circuit 56 receives and divides the second frequency-corrected clock signal $CLK_{SCOR}$ by a division constant N, which is an integer, to provide the fractionally-divided second frequency-corrected clock signal. The division constant N is provided by a division constant select signal NSEL, which is provided by the N dither circuit 58. If the division constant N remains unchanged, the frequency of the second frequency-corrected clock signal $CLK_{SCOR}$ is an integer multiple of the frequency of the reference clock signal $CLK_{REF}$. However, if the division constant N is synchronously changed, or dithered, the effective division constant may not be an integer, but a fractional value falling between two integers. The duty-cycle of the dithering determines where the effective division constant falls between the two integers. Using dithering may provide fine control of the frequency of the second frequency-corrected clock signal $CLK_{SCOR}$.

The fine control may be used to apply frequency correction, to apply a phase-shift, or both, to the second frequency-corrected clock signal $CLK_{SCOR}$. The N dither circuit 58 receives the frequency correction signal FREQCOR, which may be used to dither the division constant N to apply a frequency correction to the second frequency-corrected clock signal $CLK_{SCOR}$. The N dither circuit 58 receives the phase adjustment signal PHASEADJ, which may be used to dither the division constant N to apply a phase adjustment to the second frequency-corrected clock signal $CLK_{SCOR}$, which applies a phase adjustment to the first frequency-corrected clock signal $CLK_{FCOR}$ to enable proper transitioning of the mode selection signal MODESEL. Alternate embodiments of the present invention may omit using phase dithering for either frequency correction or phase adjusting. In some embodiments of the present invention, the phase dithering may be used to vary the frequency of the second frequency-corrected clock signal $CLK_{SCOR}$ to spread the frequency content of the system clock signal $CLK_{SYS}$. This frequency spreading may be useful in reducing RF receiver de-sensitization due to harmonics of the system clock signal $CLK_{SYS}$.

Figure 13:
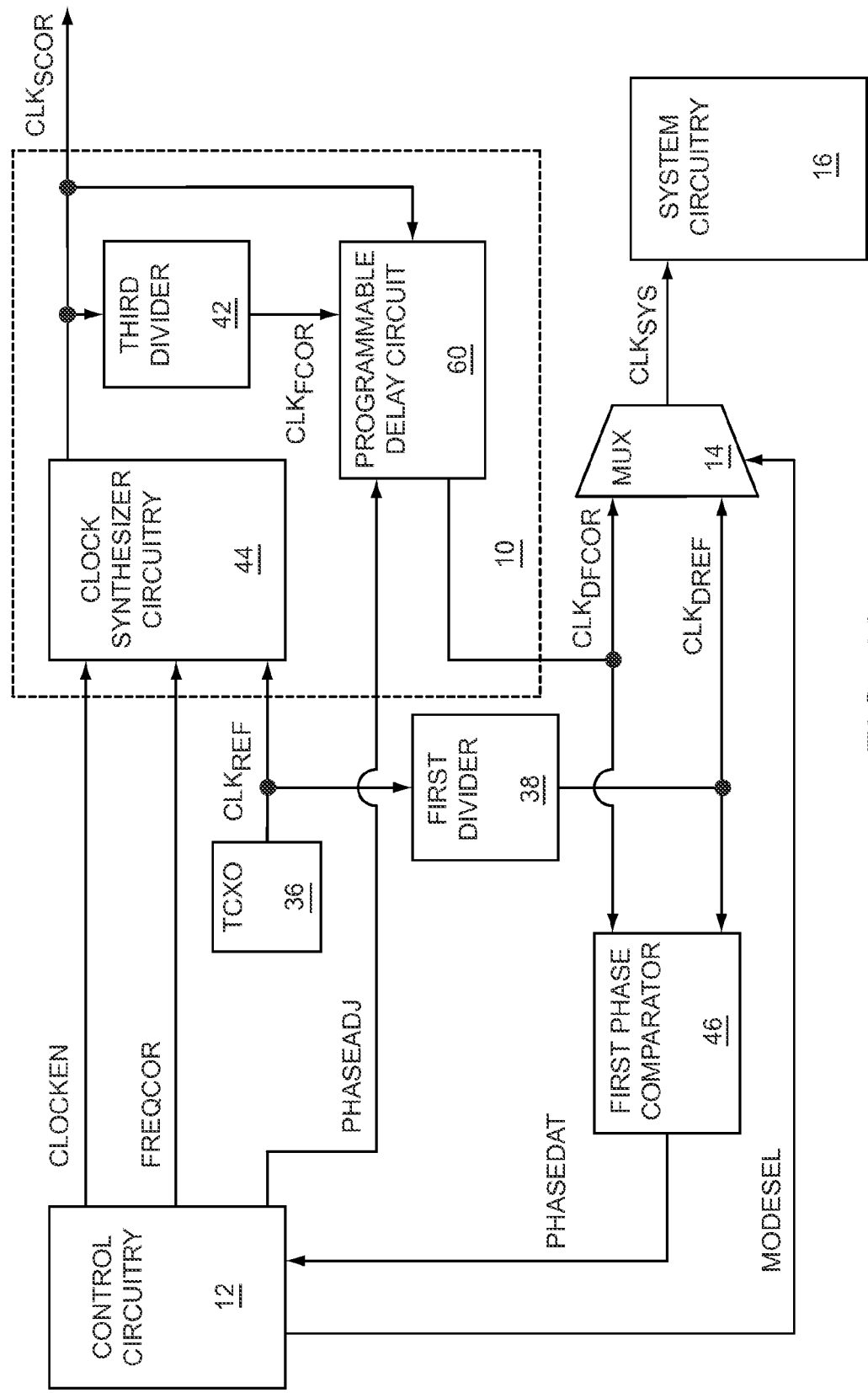
FIG. 13 shows details of the clock synthesizer and adjustment circuitry, the control circuitry, and the multiplexer providing the system clock signal to the system circuitry, according to another embodiment of the present invention.

FIG. 13 shows details of the clock synthesizer and adjustment circuitry 10, the control circuitry 12, and the multiplexer 14 providing the system clock signal $CLK_{SYS}$ to the system circuitry 16, according to another embodiment of the present invention. The circuitry illustrated in FIG. 13 is similar to the circuitry illustrated in FIG. 11, except for the addition of a programmable delay circuit 60 to the clock synthesizer and adjustment circuitry 10, which receives the phase adjustment signal PHASEADJ instead of that signal being received by the clock synthesizer circuitry 44. The programmable delay circuit 60 is coupled to the third divider 42 and receives the first frequency-corrected clock signal $CLK_{FCOR}$, which may be delayed to provide a delayed first frequency-corrected clock signal $CLK_{DFCOR}$ to the multiplexer 14 and the first phase comparator 46 instead of the first frequency-corrected clock signal $CLK_{FCOR}$. The delay is based on the phase adjustment signal PHASEADJ and may be used to phase-align the delayed first frequency-corrected clock signal $CLK_{DFCOR}$ with the divided reference clock signal $CLK_{DREF}$ to enable proper transitioning of the mode selection signal MODESEL.

The programmable delay circuit 60 receives the second frequency-corrected clock signal $CLK_{SCOR}$, which may be divided internally to provide delay steps to be applied to the first frequency-corrected clock signal $CLK_{FCOR}$. In an exemplary embodiment of the present invention, the frequency of the second frequency-corrected clock signal $CLK_{SCOR}$ is equal to about 1248 megahertz. The delay steps are based on a 312 megahertz signal divided down from the 1248 megahertz second frequency-corrected clock signal $CLK_{SCOR}$. The frequency of the delayed first frequency-corrected clock signal $CLK_{DFCOR}$ is equal to about 26 megahertz. Each delay step is about 30 degrees of a cycle of the delayed first frequency-corrected clock signal $CLK_{DFCOR}$.

FIGS. 14A, 14B, 14C, 14D, 14E, and 14F are graphs showing timing relationships between the phase adjustment signal PHASEADJ, the mode selection signal MODESEL, the frequency correction signal FREQCOR, the first frequency-corrected clock signal $CLK_{FCOR}$, the divided reference clock signal $CLK_{DREF}$, and the system clock signal $CLK_{SYS}$, respectively, related to the circuitry illustrated in FIG. 11, according to one embodiment of the present invention. Each of the phase adjustment signal PHASEADJ, the mode selection signal MODESEL, the frequency correction signal FREQCOR, the clock enable signal CLOCKEN (not shown), and the first frequency-corrected clock signal $CLK_{FCOR}$ starts out with a magnitude of zero, which corresponds to no applied phase adjustment, the system clock signal $CLK_{SYS}$ based on the divided reference clock signal $CLK_{DREF}$, no applied frequency correction, the first frequency-corrected clock signal $CLK_{FCOR}$ being disabled, and the first frequency-corrected clock signal $CLK_{FCOR}$ not transitioning, respectively. The system clock signal $CLK_{SYS}$ and the divided reference clock signal $CLK_{DREF}$ are both active and functioning normally.

Next, the clock enable signal CLOCKEN (not shown) transitions from a disabled state to an enabled state, which enables the first frequency-corrected clock signal $CLK_{FCOR}$. Since the magnitude of the frequency correction signal FREQCOR is zero, no frequency correction is applied to the first frequency-corrected clock signal $CLK_{FCOR}$, which causes the first frequency-corrected clock signal $CLK_{FCOR}$ to be about equal in frequency with the divided reference clock signal $CLK_{DREF}$; however, the first frequency-corrected clock signal $CLK_{FCOR}$ may not be phase-aligned with the divided reference clock signal $CLK_{DREF}$. The phase data PHASEDAT (not shown) is analyzed by the control circuitry 12 (not shown) to determine the amount of phase adjustment needed to bring the first frequency-corrected clock signal $CLK_{FCOR}$ into phase alignment with the divided reference clock signal $CLK_{DREF}$. The phase adjustment signal PHASEADJ is updated to reflect the needed phase adjustment. The phase data PHASEDAT is analyzed by the control circuitry 12 to verify phase-alignment. If no more phase adjustment is needed, the mode selection signal MODESEL transitions from a magnitude of zero to select the system clock signal $CLK_{SYS}$ based on the first frequency-corrected clock signal $CLK_{FCOR}$ instead of the divided reference clock signal $CLK_{DREF}$. Since the clock signals $CLK_{FCOR}$, $CLK_{DREF}$ are phase-aligned at the time of the transition, the system clock signal $CLK_{SYS}$ does not change significantly.

After selecting the system clock signal $CLK_{SYS}$ to be based on the first frequency-corrected clock signal $CLK_{FCOR}$, the frequency correction signal FREQCOR may change to frequency-correct the first frequency-corrected clock signal $CLK_{FCOR}$ as needed. When the first frequency-corrected clock signal $CLK_{FCOR}$ and the divided reference clock signal $CLK_{DREF}$ have different frequencies that are not integer multiples of each other, the phase of the first frequency-corrected clock signal $CLK_{FCOR}$ will continuously shift with respect to the phase of the divided reference clock signal $CLK_{DREF}$.

Figure 14:
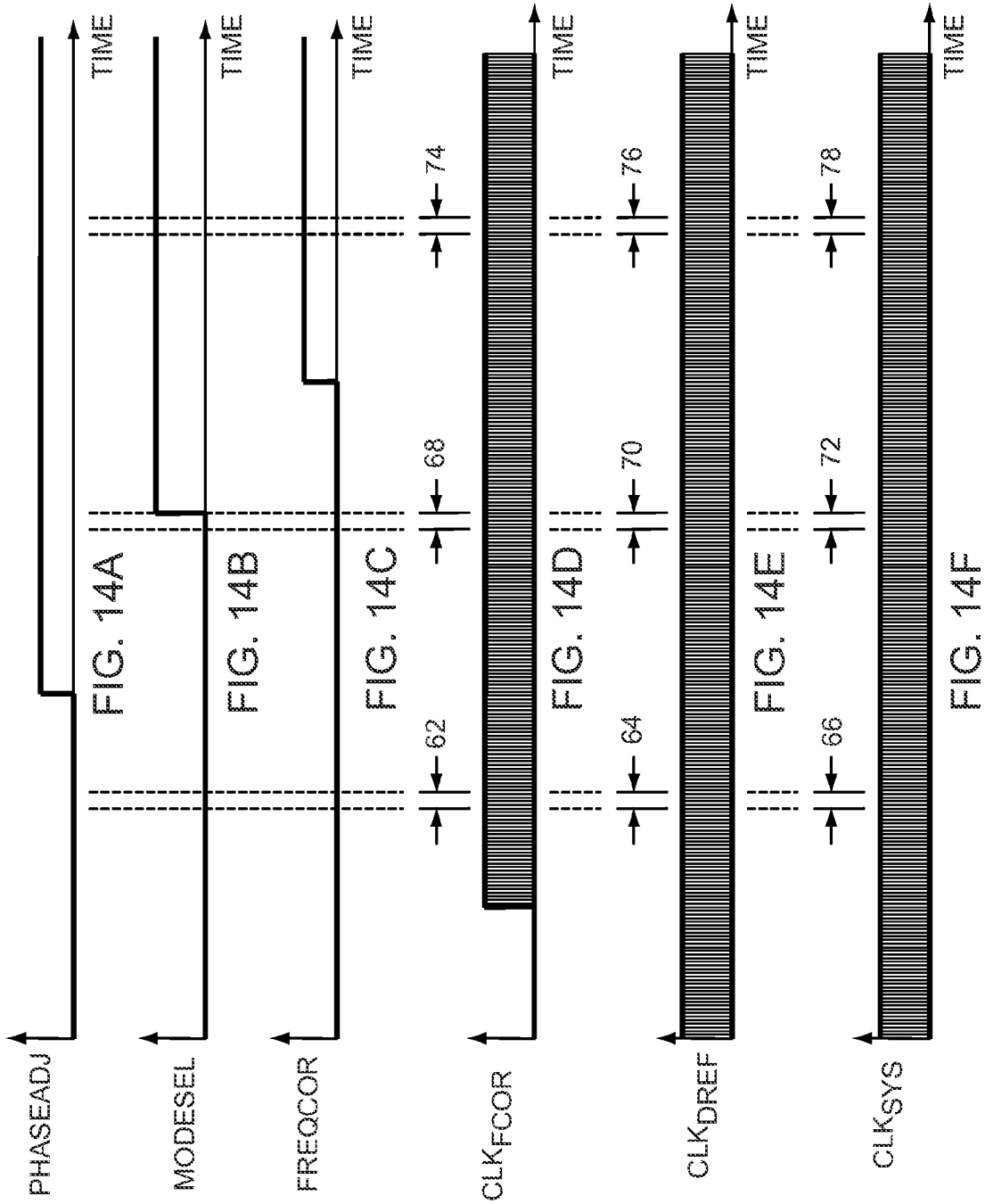

Under the conditions of no applied phase adjustment as shown in FIG. 14A, the system clock signal $CLK_{SYS}$ is based on the divided reference clock signal $CLK_{DREF}$ as shown in FIG. 14B, and no applied frequency correction as shown in FIG. 14C, a fourth corrected clock sample 62 is sampled from the first frequency-corrected clock signal $CLK_{FCOR}$, a fourth reference clock sample 64 is sampled from the divided reference clock signal $CLK_{DREF}$, and a fourth system clock sample 66 is sampled from the system clock signal $CLK_{SYS}$, as shown in FIGS. 14D, 14E, and 14F, respectively. The fourth samples 62, 64, 66 are sampled simultaneously.

Under the conditions of applied phase adjustment as shown in FIG. 14A, the system clock signal $CLK_{SYS}$ is based on the divided reference clock signal $CLK_{DREF}$ as shown in FIG. 14B, and no applied frequency correction as shown in FIG. 14C, a fifth corrected clock sample 68 is sampled from the first frequency-corrected clock signal $CLK_{FCOR}$, a fifth reference clock sample 70 is sampled from the divided reference clock signal $CLK_{DREF}$, and a fifth system clock sample 72 is sampled from the system clock signal $CLK_{SYS}$, as shown in FIGS. 14D, 14E, and 14F, respectively. The fifth samples 68, 70, 72 are sampled simultaneously just before the mode selection signal MODESEL transitions from a magnitude of zero.

Under the conditions of applied phase adjustment as shown in FIG. 14A, the system clock signal $CLK_{SYS}$ is based on the first frequency-corrected clock signal $CLK_{FCOR}$ as shown in FIG. 14B, and applied frequency correction as shown in FIG. 14C, a sixth corrected clock sample 74 is sampled from the first frequency-corrected clock signal $CLK_{FCOR}$, a sixth reference clock sample 76 is sampled from the divided reference clock signal $CLK_{DREF}$, and a sixth system clock sample 78 is sampled from the system clock signal $CLK_{SYS}$, as shown in FIGS. 14D, 14E, and 14F, respectively. The sixth samples 74, 76, 78 are sampled simultaneously.

Alternate embodiments of the present invention may use other magnitudes of the phase adjustment signal PHASEADJ, may use one or more additional signals, or both, to represent applied phase adjustment or no applied phase adjustment. With no applied frequency correction, the first frequency-corrected clock signal $CLK_{FCOR}$ may be about equal in frequency to the divided reference clock signal $CLK_{DREF}$; however, the first frequency-corrected clock signal $CLK_{FCOR}$ may or may not be phase-aligned with the divided reference clock signal $CLK_{DREF}$.

Figure 15:
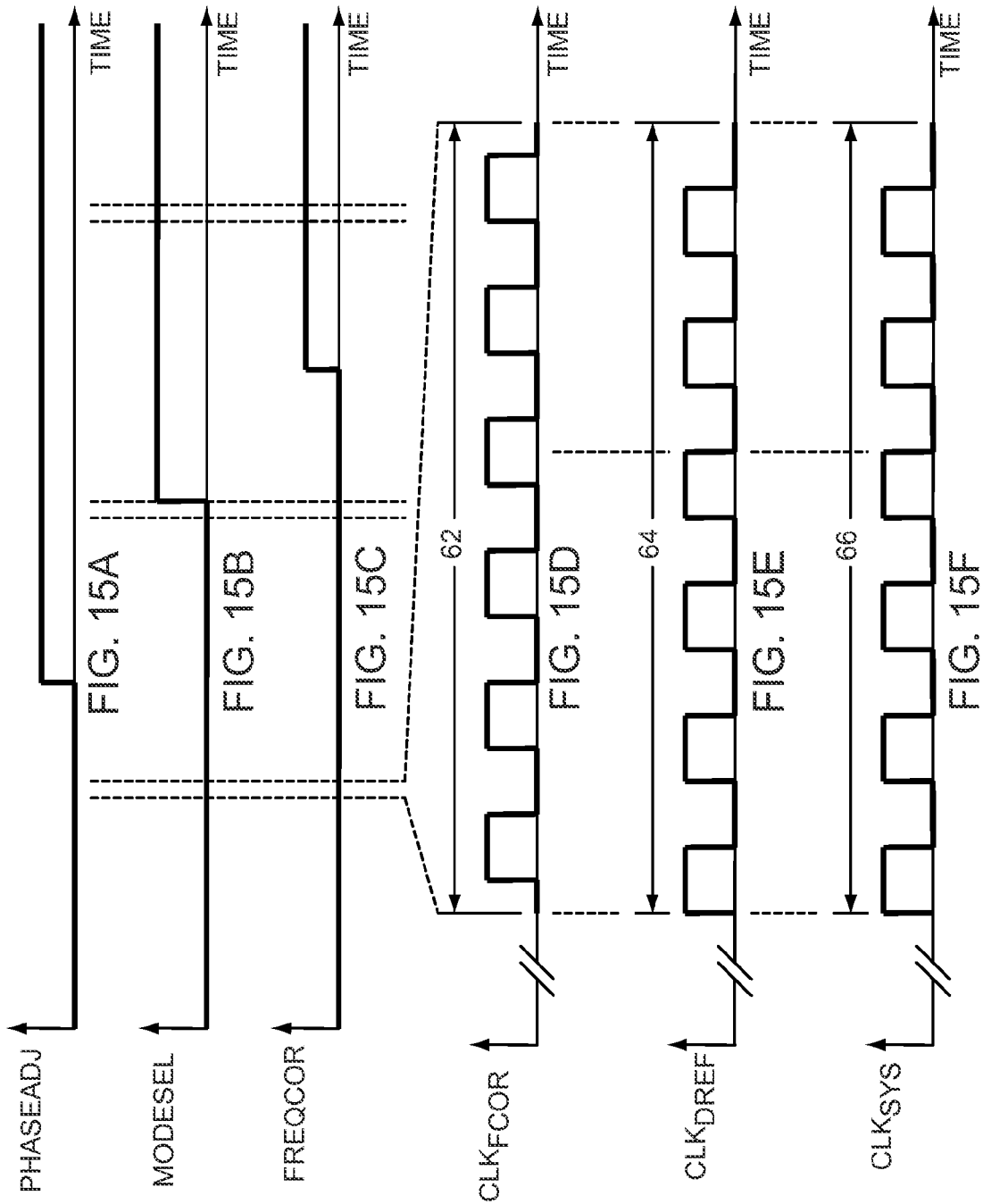

FIGS. 15A, 15B, 15C, 15D, 15E, and 15F are graphs showing timing relationships between the phase adjustment signal PHASEADJ, the mode selection signal MODESEL, the frequency correction signal FREQCOR, and details of the first frequency-corrected clock signal $CLK_{FCOR}$, the divided reference clock signal $CLK_{DREF}$, and the system clock signal $CLK_{SYS}$, respectively, illustrated in FIGS. 14A, 14B, 14C, 14D, 14E, and 14F. FIGS. 15A, 15B, and 15C are equivalent to FIGS. 14A, 14B, and 14C, respectively, and are shown for clarification.

Under the conditions of no applied phase adjustment as shown in FIG. 15A, the system clock signal $CLK_{SYS}$ is based on the divided reference clock signal $CLK_{DREF}$ as shown in FIG. 15B, and no applied frequency correction as shown in FIG. 15C, the fourth reference clock sample 64 and the fourth system clock sample 66 show that the divided reference clock signal $CLK_{DREF}$ is phase-aligned with the system clock signal $CLK_{SYS}$, as shown in FIGS. 15E and 15F, respectively, as expected since the system clock signal $CLK_{SYS}$ is based on the divided reference clock signal $CLK_{DREF}$. However, the fourth corrected clock sample 62 and the fourth reference clock sample 64 show that the first frequency-corrected clock signal $CLK_{FCOR}$ may not be phase-aligned with the divided reference clock signal $CLK_{DREF}$, as shown in FIGS. 15D and 15E.

Figure 16:
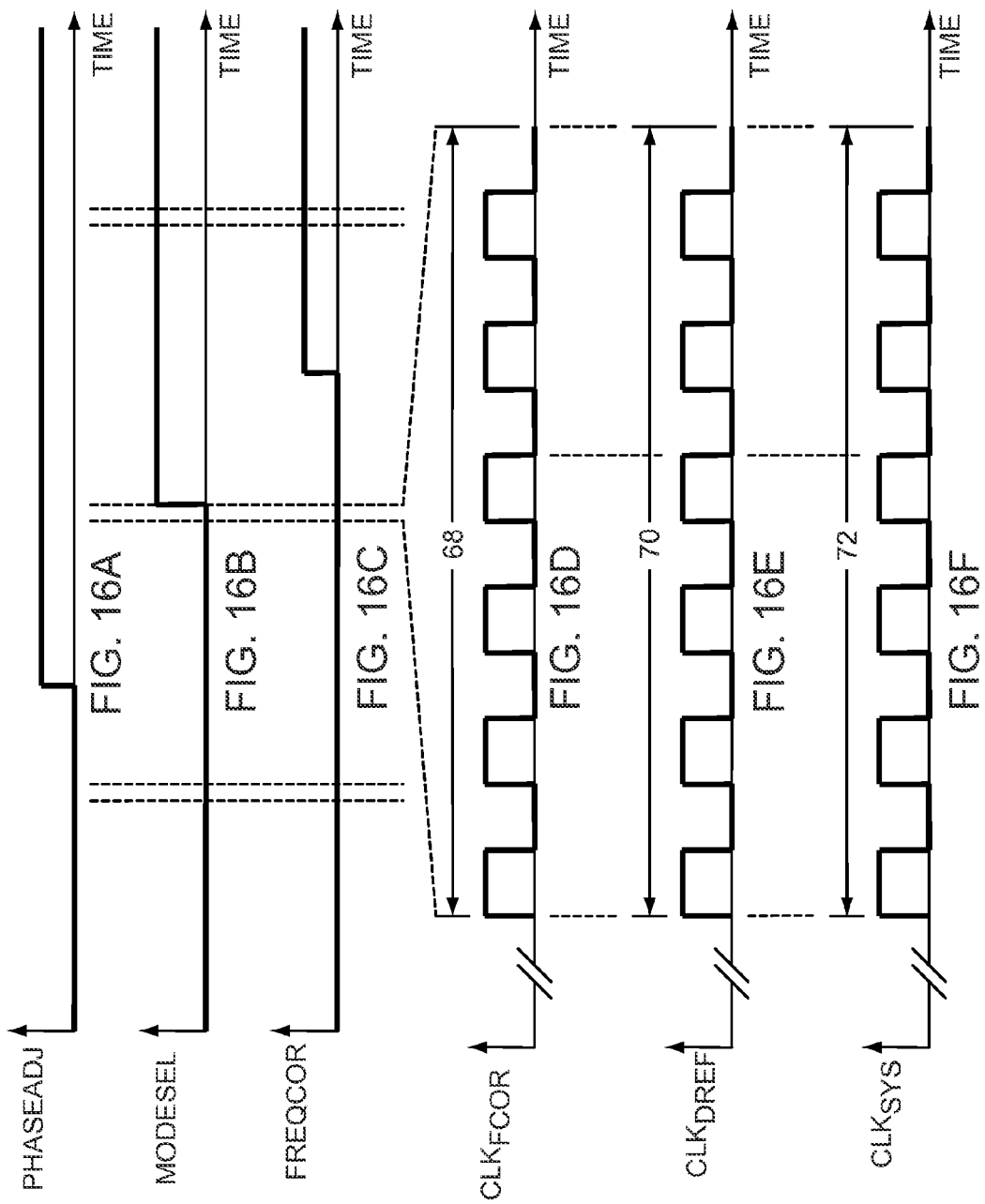

FIGS. 16A, 16B, 16C, 16D, 16E, and 16F are graphs showing timing relationships between the phase adjustment signal PHASEADJ, the mode selection signal MODESEL, the frequency correction signal FREQCOR, and additional details of the first frequency-corrected clock signal $CLK_{FCOR}$, the divided reference clock signal $CLK_{DREF}$, and the system clock signal $CLK_{SYS}$, respectively, illustrated in FIGS. 14A, 14B, 14C, 14D, 14E, and 14F. FIGS. 16A, 16B, and 16C are equivalent to FIGS. 14A, 14B, and 14C, respectively, and are shown for clarification. Under the conditions wherein the phase adjustment signal PHASEADJ has transitioned to apply phase adjustment to the first frequency-corrected clock signal $CLK_{FCOR}$ as shown in FIG. 16A, the system clock signal $CLK_{SYS}$ is based on the first frequency-corrected clock signal $CLK_{FCOR}$ as shown in FIG. 16B, and no applied frequency correction as shown in FIG. 16C, the fifth samples 68, 70, 72 show that the first frequency-corrected clock signal $CLK_{FCOR}$, the divided reference clock signal $CLK_{DREF}$, and the system clock signal $CLK_{SYS}$, are all three phase-aligned as shown in FIGS. 16D, 16E, and 16F, respectively. Therefore, conditions have been established for properly transitioning the mode selection signal MODESEL.

Figure 17:
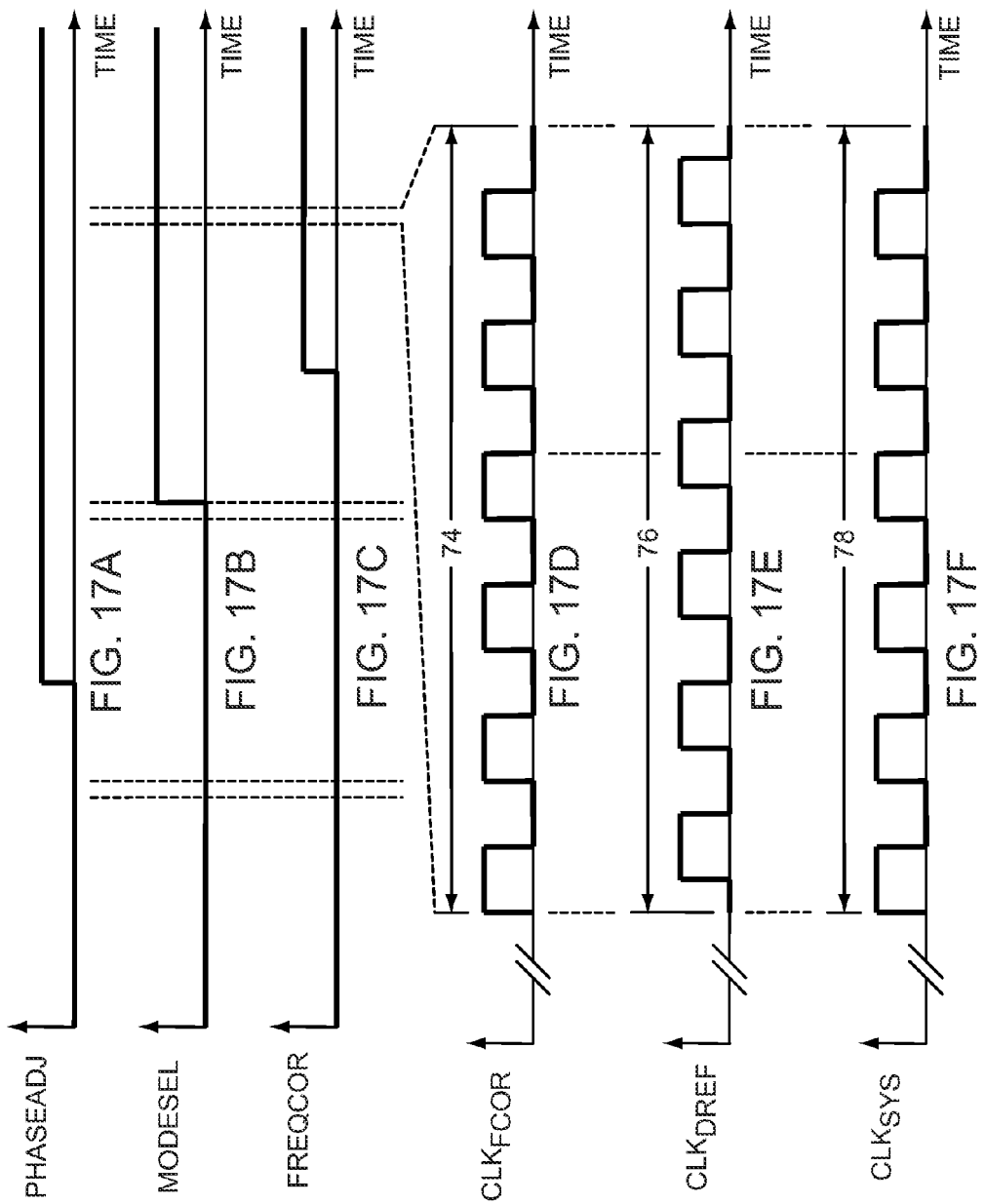

FIGS. 17A, 17B, 17C, 17D, 17E, and 17F are graphs showing timing relationships between the phase adjustment signal PHASEADJ, the mode selection signal MODESEL, the frequency correction signal FREQCOR, and other details of the first frequency-corrected clock signal $CLK_{FCOR}$, the divided reference clock signal $CLK_{DREF}$, and the system clock signal $CLK_{SYS}$, respectively, illustrated in FIGS. 14A, 14B, 14C, 14D, 14E, and 14F. FIGS. 17A, 17B, and 17C are equivalent to FIGS. 14A, 14B, and 14C, respectively, and are shown for clarification. Under the conditions of applied phase adjustment to the first frequency-corrected clock signal $CLK_{FCOR}$ as shown in FIG. 17A, the mode selection signal MODESEL has transitioned so that the system clock signal $CLK_{SYS}$ is based on the first frequency-corrected clock signal $CLK_{FCOR}$ as shown in FIG. 17B, and the frequency correction signal FREQCOR has transitioned to apply frequency correction as shown in FIG. 17C, the sixth corrected clock sample 74 and the sixth system clock sample 78 show that the first frequency-corrected clock signal $CLK_{FCOR}$ is phase-aligned with the system clock signal $CLK_{SYS}$, as shown in FIGS. 17D and 17F, respectively, as expected since the system clock signal $CLK_{SYS}$ is based on the first frequency-corrected clock signal $CLK_{FCOR}$.

However, since the frequency correction signal FREQCOR is applying frequency-correction to the first frequency-corrected clock signal $CLK_{FCOR}$, the first frequency-corrected clock signal $CLK_{FCOR}$ and the divided reference clock signal $CLK_{DREF}$ have different frequencies; therefore, the phase of the first frequency-corrected clock signal $CLK_{FCOR}$ will continuously shift with respect to the phase of the divided reference clock signal $CLK_{DREF}$. The sixth corrected clock sample 74 and the sixth reference clock sample 76 show the first frequency-corrected clock signal $CLK_{FCOR}$ phase-shifted from the divided reference clock signal $CLK_{DREF}$, as illustrated in FIGS. 17D and 17E, respectively. However, since the system clock signal $CLK_{SYS}$ is based on the first frequency-corrected clock signal $CLK_{FCOR}$, the phase relationship to the divided reference clock signal $CLK_{DREF}$ has no significant impact on the system clock signal $CLK_{SYS}$.

FIGS. 18A, 18B, 18C, 18D, 18E, and 18F are graphs showing additional timing relationships between the phase adjustment signal PHASEADJ, the mode selection signal MODESEL, the clock enable signal CLOCKEN, the first frequency-corrected clock signal $CLK_{FCOR}$, the divided reference clock signal $CLK_{DREF}$, and the system clock signal $CLK_{SYS}$, respectively, related to the circuitry illustrated in FIG. 11, according to one embodiment of the present invention. Each of the phase adjustment signal PHASEADJ, the mode selection signal MODESEL, and the clock enable signal CLOCKEN starts out with a non-zero magnitude, which corresponds to applied phase adjustment, the system clock signal $CLK_{SYS}$ based on the first frequency-corrected clock signal $CLK_{FCOR}$, and the first frequency-corrected clock signal $CLK_{FCOR}$ being enabled, respectively. The first frequency-corrected clock signal $CLK_{FCOR}$, the divided reference clock signal $CLK_{DREF}$, and the system clock signal $CLK_{SYS}$ are active and functioning normally.

When operations requiring frequency-corrected clocks are completed, it may be desirable to disable the first and second frequency-corrected clock signals $CLK_{FCOR}$, $CLK_{SCOR}$ to conserve power, reduce noise, or for other reasons. Several steps are taken to disable the first and second frequency-corrected clock signals $CLK_{FCOR}$, $CLK_{SCOR}$. The phase adjustment signal PHASEADJ is changed bring the phase of the first frequency-corrected clock signal $CLK_{FCOR}$ into alignment with the phase of the divided reference clock signal $CLK_{DREF}$. Next, the mode selection signal MODESEL transitions to a magnitude of zero to select the system clock signal $CLK_{SYS}$ based on the divided reference clock signal $CLK_{DREF}$ instead of the first frequency-corrected clock signal $CLK_{FCOR}$, which does not cause any phase-jumps in the system clock signal $CLK_{SYS}$. The clock enable signal CLOCKEN transitions from the enabled state to the disabled state, which drives the magnitude of the first frequency-corrected clock signal $CLK_{FCOR}$ and the second frequency-corrected clock signal $CLK_{SCOR}$ (not shown) to zero.

Figure 18:
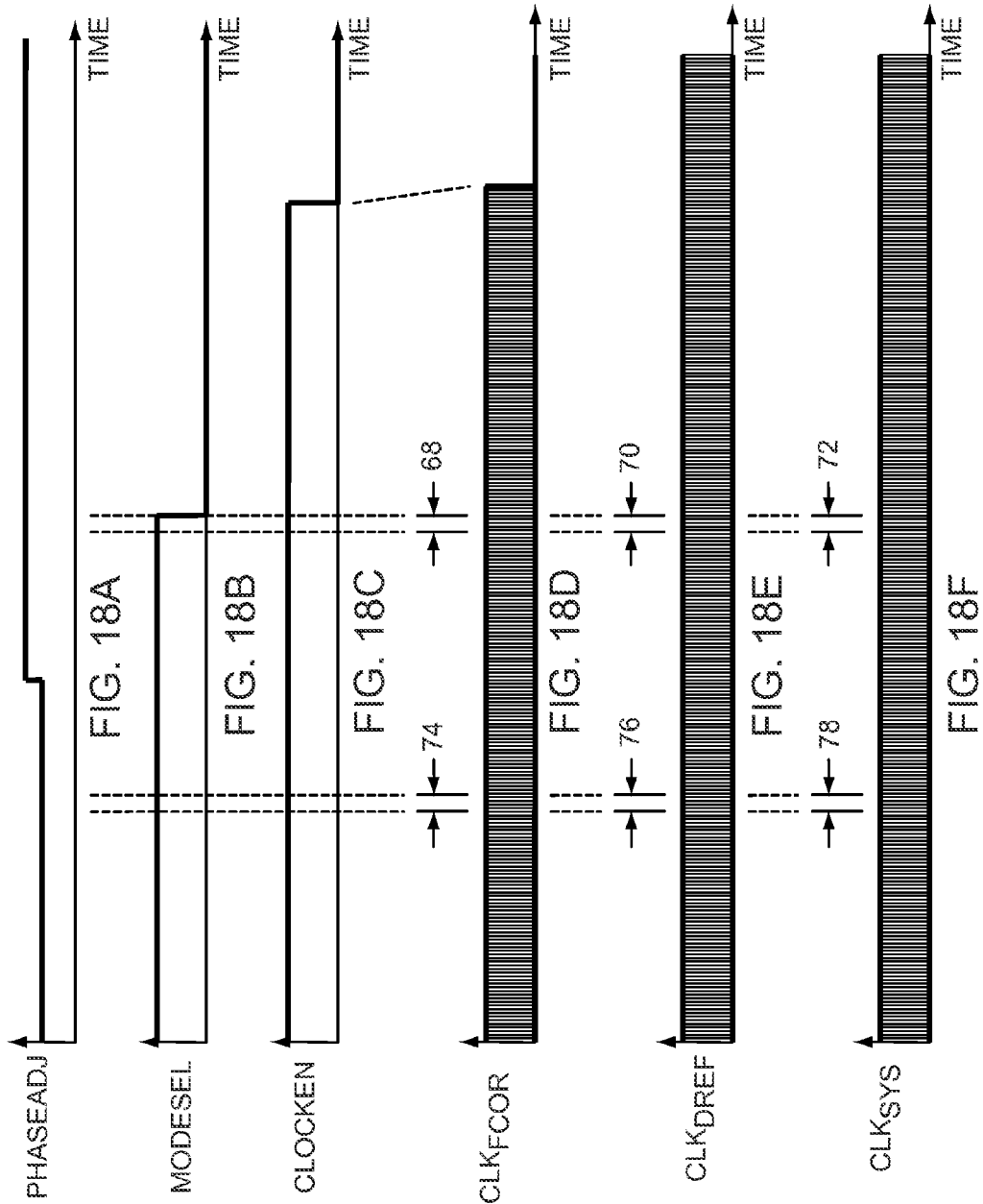

Under the conditions of previously applied phase adjustment as shown in FIG. 18A, the system clock signal $CLK_{SYS}$ is based on the first frequency-corrected clock signal $CLK_{FCOR}$ as shown in FIG. 18B, and the first frequency-corrected clock signal $CLK_{FCOR}$ is enabled as shown in FIG. 18C, the sixth corrected clock sample 74 is sampled from the first frequency-corrected clock signal $CLK_{FCOR}$, the sixth reference clock sample 76 is sampled from the divided reference clock signal $CLK_{DREF}$, and the sixth system clock sample 78 is sampled from the system clock signal $CLK_{SYS}$, as shown in FIGS. 18D, 18E, and 18F, respectively. The sixth samples 74, 76, 78 are sampled simultaneously.

Under the conditions of recently applied phase adjustment as shown in FIG. 18A, the system clock signal $CLK_{SYS}$ is based on the first frequency-corrected clock signal $CLK_{FCOR}$ as shown in FIG. 18B, and the first frequency-corrected clock signal $CLK_{FCOR}$ is enabled as shown in FIG. 18C, the fifth corrected clock sample 68 is sampled from the first frequency-corrected clock signal $CLK_{FCOR}$, the fifth reference clock sample 70 is sampled from the divided reference clock signal $CLK_{DREF}$, and the fifth system clock sample 72 is sampled from the system clock signal $CLK_{SYS}$, as shown in FIGS. 18D, 18E, and 18F, respectively. The fifth samples 68, 70, 72 are sampled simultaneously just before the mode selection signal MODESEL transitions to a magnitude of zero, which causes the system clock signal $CLK_{SYS}$ to be based on the divided reference clock signal $CLK_{DREF}$ instead of the first frequency-corrected clock signal $CLK_{FCOR}$. The clock enable signal CLOCKEN then transitions to a magnitude of zero, thereby disabling the first frequency-corrected clock signal $CLK_{FCOR}$.

Figure 19:
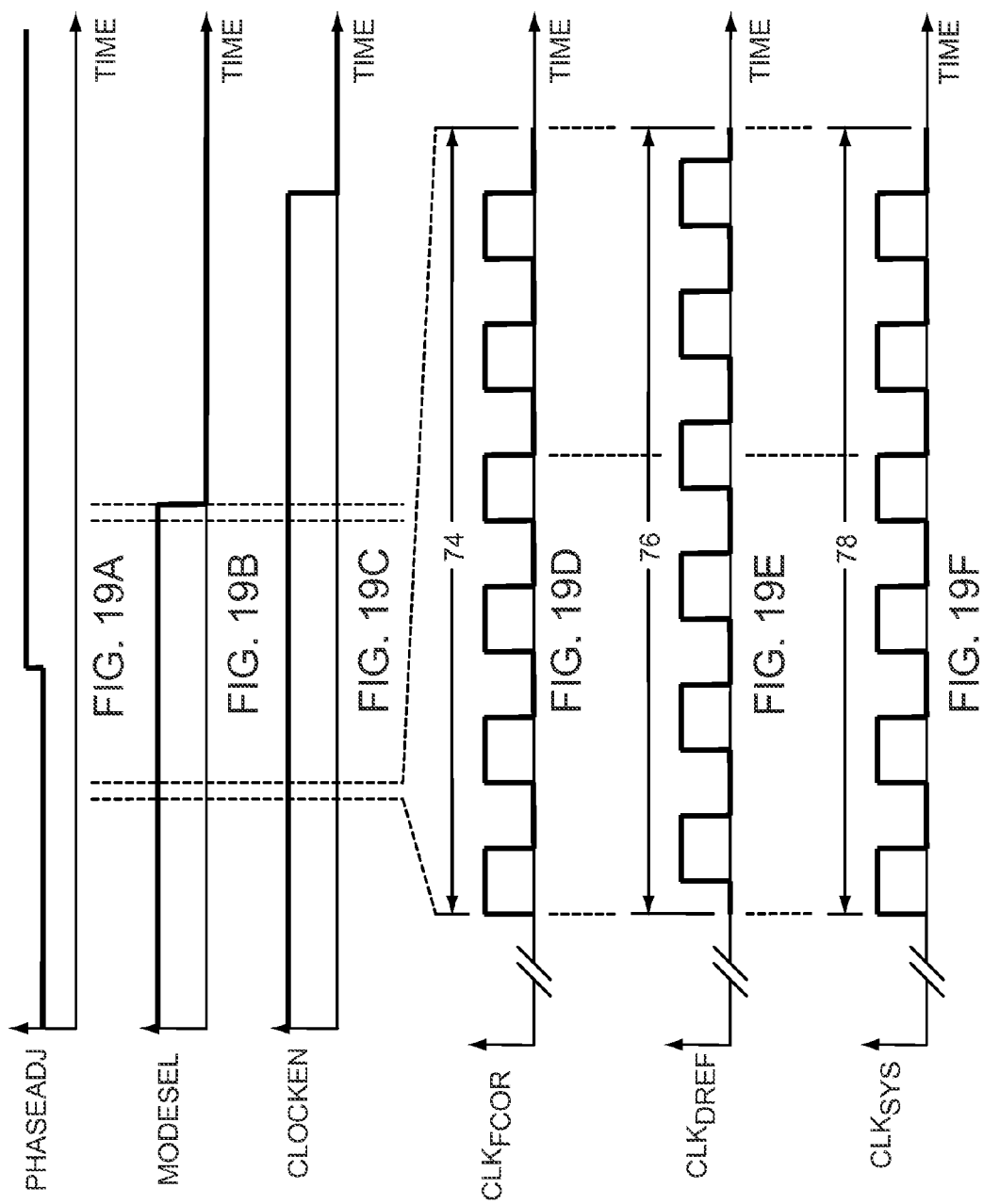

FIGS. 19A, 19B, 19C, 19D, 19E, and 19F are graphs showing timing relationships between the phase adjustment signal PHASEADJ, the mode selection signal MODESEL, the clock enable signal CLOCKEN, and details of the first frequency-corrected clock signal $CLK_{FCOR}$, the divided reference clock signal $CLK_{DREF}$, and the system clock signal $CLK_{SYS}$, respectively, illustrated in FIGS. 18A, 18B, 18C, 18D, 18E, and 18F. FIGS. 19A, 19B, and 19C are equivalent to FIGS. 18A, 18B, and 18C, respectively, and are shown for clarification. Under the conditions of applied phase adjustment to the first frequency-corrected clock signal $CLK_{FCOR}$ as shown in FIG. 19A, the system clock signal $CLK_{SYS}$ is based on the first frequency-corrected clock signal $CLK_{FCOR}$ as shown in FIG. 19B, and the first frequency-corrected clock signal $CLK_{FCOR}$ is enabled as shown in FIG. 19C, the sixth corrected clock sample 74 and the sixth system clock sample 78 show that the first frequency-corrected clock signal $CLK_{FCOR}$ is phase-aligned with the system clock signal $CLK_{SYS}$, as shown in FIGS. 19D and 19F, respectively, as expected since the system clock signal $CLK_{SYS}$ is based on the first frequency-corrected clock signal $CLK_{FCOR}$.

However, since the frequency correction signal FREQCOR (not shown) may be applying frequency-correction to the first frequency-corrected clock signal $CLK_{FCOR}$, the first frequency-corrected clock signal $CLK_{FCOR}$ and the divided reference clock signal $CLK_{DREF}$ may have different frequencies; therefore, the phase of the first frequency-corrected clock signal $CLK_{FCOR}$ may continuously shift with respect to the phase of the divided reference clock signal $CLK_{DREF}$. The sixth corrected clock sample 74 and the sixth reference clock sample 76 show the first frequency-corrected clock signal $CLK_{FCOR}$ phase-shifted from the divided reference clock signal $CLK_{DREF}$, as illustrated in FIGS. 19D and 19E, respectively. However, since the system clock signal $CLK_{SYS}$ is based on the first frequency-corrected clock signal $CLK_{FCOR}$, the phase relationship to the divided reference clock signal $CLK_{DREF}$ has no significant impact on the system clock signal $CLK_{SYS}$.

Figure 20:
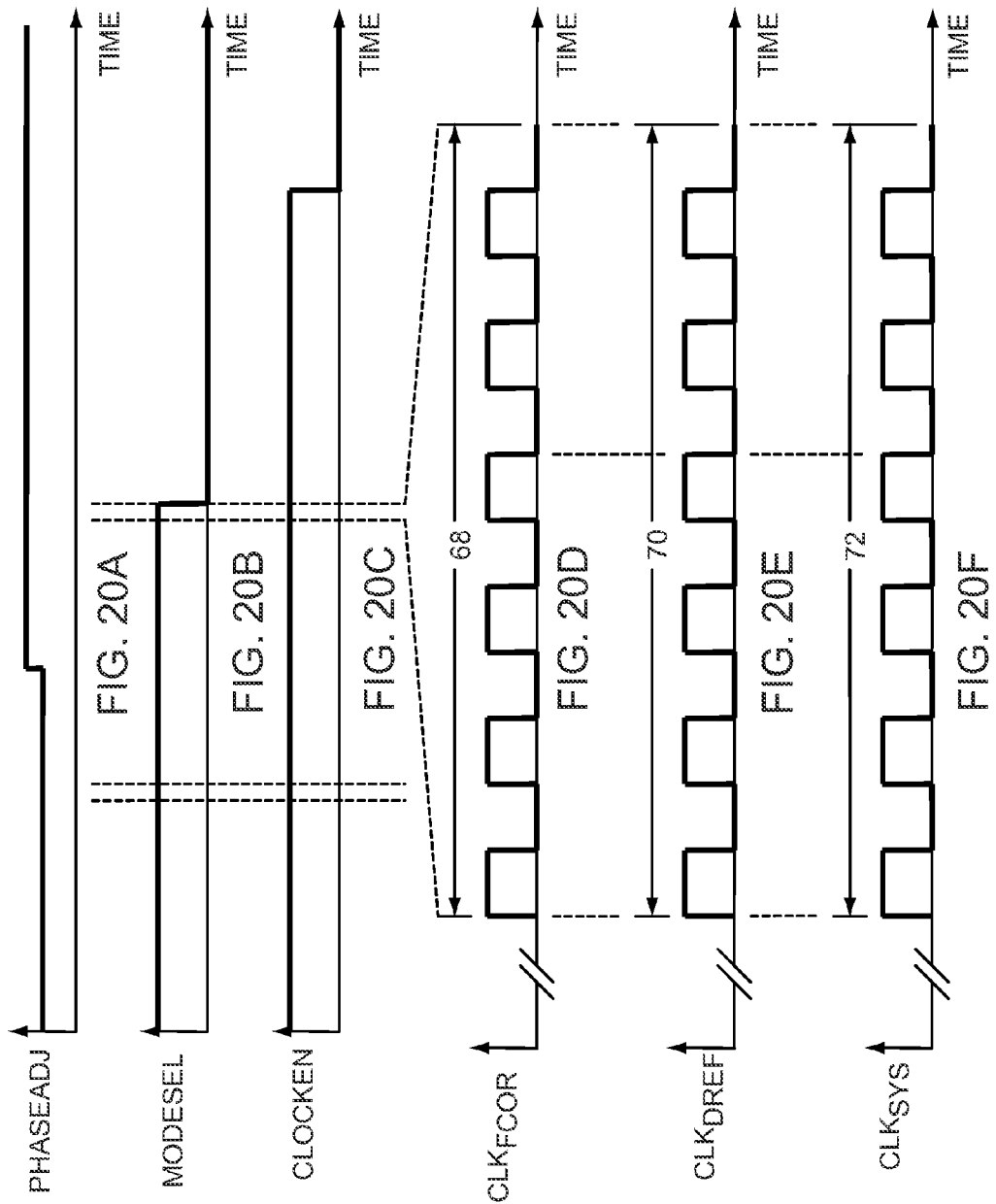

FIGS. 20A, 20B, 20C, 20D, 20E, and 20F are graphs showing timing relationships between the phase adjustment signal PHASEADJ, the mode selection signal MODESEL, the clock enable signal CLOCKEN, and additional details of the first frequency-corrected clock signal $CLK_{FCOR}$, the divided reference clock signal $CLK_{DREF}$, and the system clock signal $CLK_{SYS}$, respectively, illustrated in FIGS. 18A, 18B, 18C, 18D, 18E, and 18F. FIGS. 20A, 20B, and 20C are equivalent to FIGS. 18A, 18B, and 18C, respectively, and are shown for clarification. Under the conditions wherein the phase adjustment signal PHASEADJ has transitioned to update phase adjustment to the first frequency-corrected clock signal $CLK_{FCOR}$ as shown in FIG. 20A, the system clock signal $CLK_{SYS}$ is based on the first frequency-corrected clock signal $CLK_{FCOR}$ as shown in FIG. 20B, and the first frequency-corrected clock signal $CLK_{FCOR}$ is enabled as shown in FIG. 20C, the fifth samples 68, 70, 72 show that the first frequency-corrected clock signal $CLK_{FCOR}$, the divided reference clock signal $CLK_{DREF}$, and the system clock signal $CLK_{SYS}$, are all phase-aligned as shown in FIGS. 20D, 20E, and 20F, respectively. Therefore, conditions have been established for properly transitioning the mode selection signal MODESEL.

FIG. 21 shows the clock synthesizer and adjustment circuitry 10, the control circuitry 12, and several multiplexers providing the system clock signal $CLK_{SYS}$ and two auxiliary clock signals, according to an alternative embodiment of the present invention. The clock synthesizer and adjustment circuitry 10 includes the clock synthesizer circuitry 44, which receives the reference clock signal $CLK_{REF}$, the clock enable signal CLOCKEN, and the frequency correction signal FREQCOR, and provides the second frequency-corrected clock signal $CLK_{SCOR}$, which is based on the reference clock signal $CLK_{REF}$, the clock enable signal CLOCKEN, and the frequency correction signal FREQCOR, as previously discussed.

The clock synthesizer and adjustment circuitry 10 also includes phase adjustment circuitry 80, which receives, divides, and phase-adjusts the second frequency-corrected clock signal $CLK_{SCOR}$ to provide the first frequency-corrected clock signal $CLK_{FCOR}$. The phase adjustment circuitry 80 may make continuous phase adjustments to the first frequency-corrected clock signal $CLK_{FCOR}$. The first divider 38, a fourth divider 82, a fifth divider 84, a sixth divider 86, a second multiplexer 88, and a third multiplexer 90 provide the two auxiliary clock signals. The first divider 38 receives and divides the reference clock signal $CLK_{REF}$ to create a first divided reference clock signal $CLK_{DREF1}$, which is provided to the second multiplexer 88, the phase adjustment circuitry 80, and the sixth divider 86. The sixth divider 86 divides the first divided reference clock signal $CLK_{DREF1}$ to create a second divided reference clock signal $CLK_{DREF2}$, which is provided to the third multiplexer 90 and the phase adjustment circuitry 80.

The fourth divider 82 receives and divides the first frequency corrected clock signal $CLK_{FCOR}$ to create a third frequency corrected clock signal $CLK_{TCOR}$, which is provided to the second multiplexer 88, the phase adjustment circuitry 80, and the fifth divider 84. The fifth divider 84 divides the third frequency corrected clock signal $CLK_{TCOR}$ to create a fourth frequency corrected clock signal $CLK_{FOCOR}$, which is provided to the third multiplexer 90 and the phase adjustment circuitry 80. The multiplexer 14 provides the system clock signal $CLK_{SYS}$, which is based on either the first frequency-corrected clock signal $CLK_{FCOR}$ or the reference clock signal $CLK_{REF}$, depending on the mode selection signal MODESEL provided by the control circuitry 12, as previously discussed. The second multiplexer 88 provides a first auxiliary clock signal $CLK_{AUX1}$, which is based on either the third frequency-corrected clock signal $CLK_{TCOR}$ or the first divided reference clock signal $CLK_{DREF1}$, depending on a second mode selection signal MODESEL2 provided by the control circuitry 12. The third multiplexer 90 provides a second auxiliary clock signal $CLK_{AUX2}$, which is based on either the fourth frequency-corrected clock signal $CLK_{FOCOR}$ or the second divided reference clock signal $CLK_{DREF2}$, depending on a third mode selection signal MODESEL3 provided by the control circuitry 12.

The phase adjustment circuitry 80 receives a comparison select signal COMPSEL from the control circuitry 12 that selects one pair of the first frequency-corrected clock signal $CLK_{FCOR}$ and the reference clock signal $CLK_{REF}$, the third frequency-corrected clock signal $CLK_{TCOR}$ and the first divided reference clock signal $CLK_{DREF1}$, and the fourth frequency-corrected clock signal $CLK_{FOCOR}$ and the second divided reference clock signal $CLK_{DREF2}$, for phase comparison. The first auxiliary clock signal $CLK_{AUX1}$ may provide either a frequency-corrected clock or a non-frequency-corrected clock as needed by system circuitry (not shown). The second auxiliary clock signal $CLK_{AUX2}$ may provide either a frequency-corrected clock or a non-frequency-corrected clock as needed by system circuitry (not shown). In an exemplary embodiment of the present invention, the frequency of the system clock signal $CLK_{SYS}$ is about 52 megahertz, the frequency of the first auxiliary clock signal $CLK_{AUX1}$ is about 26 megahertz, and the frequency of the second auxiliary clock signal $CLK_{AUX2}$ is about 13 megahertz. Other embodiments of the present invention may omit either or both of the second multiplexer 88 and the third multiplexer 90.

FIG. 22 shows details of the clock synthesizer and adjustment circuitry 10 illustrated in FIG. 21. The phase adjustment circuitry 80 includes an M dither circuit 92, a divide by M circuit 94, phase discrimination circuitry 96, a fourth multiplexer 98, and a fifth multiplexer 100. The fourth multiplexer 98 provides a first comparison signal COMP1, which is based on one of the reference clock signal $CLK_{REF}$, the first divided reference clock signal $CLK_{DREF1}$, and the second divided reference clock signal $CLK_{DREF2}$, depending on the comparison select signal COMPSEL. The fifth multiplexer 100 provides a second comparison signal COMP2, which is based on one of the first frequency-corrected clock signal $CLK_{FCOR}$, the third frequency-corrected clock signal $CLK_{TCOR}$, and the fourth frequency-corrected clock signal $CLK_{FOCOR}$, depending on the comparison select signal COMPSEL. The phase discrimination circuitry 96 receives and compares the phases of the first comparison signal COMP1 and the second comparison signal COMP2. The phase discrimination circuitry 96 provides phase information PHASEINF based on the phases of the first and second comparison signals COMP1, COMP2, to the M dither circuit 92.

The divide by M circuit 94 receives and divides the second frequency-corrected clock signal $CLK_{SCOR}$ by a division constant M, which is an integer, to provide the first frequency-corrected clock signal $CLK_{FCOR}$. The division constant M is provided by a division constant select signal MSEL, which is provided by the M dither circuit 92. If the division constant M remains unchanged, the frequency of the second frequency-corrected clock signal $CLK_{SCOR}$ is an integer multiple of the frequency of the first frequency-corrected clock signal $CLK_{FCOR}$, and the phase of the second frequency-corrected clock signal $CLK_{SCOR}$ relative to the phase of the first frequency-corrected clock signal $CLK_{FCOR}$ is fixed. However, if the division constant M is synchronously changed, or dithered, the effective division constant may not be an integer, but a fractional value falling between two integers. The duty-cycle of the dithering determines where the effective division constant falls between the two integers.

Dithering may be used to phase-shift the phase of the first frequency-corrected clock signal $CLK_{FCOR}$ relative to the second frequency-corrected clock signal $CLK_{SCOR}$. Since the second frequency-corrected clock signal $CLK_{SCOR}$ is based on the reference clock signal $CLK_{REF}$, dithering may be used to phase-shift the phase of the first frequency-corrected clock signal $CLK_{FCOR}$ relative to the reference clock signal $CLK_{REF}$. Since the phase information PHASEINF is based on the phases of the first and second comparison signals COMP1, COMP2, the M dither circuit 92 can use dithering to substantially phase-align the first and second comparison signals COMP1, COMP2 to enable proper transitioning of the mode selection signal MODESEL, the second mode selection signal MODESEL2, or the third mode selection signal MODESEL3. In one embodiment of the present invention, the phase information PHASEINF indicates one of two states, either the first comparison signal COMP1 leads the second comparison signal COMP2 or the first comparison signal COMP1 lags the second comparison signal COMP2. When the first comparison signal COMP1 leads the second comparison signal COMP2, the M dither circuit 92 may use dithering to delay the phase of the first comparison signal COMP1. Then, when the first comparison signal COMP1 lags the second comparison signal COMP2, the M dither circuit 92 may use dithering to advance the phase of the first comparison signal COMP1 until the first comparison signal COMP1 leads the second comparison signal COMP2. The cycle may be repeated continuously such that the first and second comparison signals COMP1, COMP2 are continuously phase-aligned and transitioning between modes can occur at any time.

In a first embodiment of the present invention, the comparison select signal COMPSEL is configured such that the first comparison signal COMP1 is based on the reference clock signal $CLK_{REF}$ and the second comparison signal COMP2 is based on the first frequency-corrected clock signal $CLK_{FCOR}$. The M dither circuit 92 uses dithering to continuously phase-align the reference clock signal $CLK_{REF}$ and the first frequency-corrected clock signal $CLK_{FCOR}$, such that proper transitioning of the mode selection signal MODESEL is continuously enabled.

In a second embodiment of the present invention, the comparison select signal COMPSEL is configured such that the first comparison signal COMP1 is based on the first divided reference clock signal $CLK_{DREF1}$, and the second comparison signal COMP2 is based on the third frequency-corrected clock signal $CLK_{TCOR}$. The M dither circuit 92 uses dithering to continuously phase-align the first divided reference clock signal $CLK_{DREF1}$ and the third frequency-corrected clock signal $CLK_{TCOR}$, such that proper transitioning of the second mode selection signal MODESEL2 is continuously enabled.

In a third embodiment of the present invention, the comparison select signal COMPSEL is configured such that the first comparison signal COMP1 is based on the second divided reference clock signal $CLK_{DREF2}$, and the second comparison signal COMP2 is based on the fourth frequency-corrected clock signal $CLK_{FOCOR}$. The M dither circuit 92 uses dithering to continuously phase-align the second divided reference clock signal $CLK_{DREF2}$ and the fourth frequency-corrected clock signal $CLK_{FOCOR}$, such that proper transitioning of the third mode selection signal MODESEL3 is continuously enabled. Alternate embodiments of the present invention may omit any or all of the second multiplexer 88, the third multiplexer 90, the fourth multiplexer 98, the fifth multiplexer 100, the first divider 38, the fourth divider 82, the fifth divider 84, and the sixth divider 86.

FIG. 23 shows details of phase discrimination circuitry 96 illustrated in FIG. 22. A clock input CLK of a flip-flop circuit 102 receives the second comparison signal COMP2 and a data input DIN of the flip-flop circuit 102 receives the first comparison signal COMP1. A data output QOUT of the flip-flop circuit 102 provides the phase information PHASEINF. When the second comparison signal COMP2 clocks the flip-flop circuit 102, the first comparison signal COMP1 will be either a logic "0" or a logic "1," depending on whether the first comparison signal COMP1 lags or leads the second comparison signal COMP2. Therefore, the data output QOUT will be indicative of whether the first comparison signal COMP1 lags or leads the second comparison signal COMP2.

FIG. 24 shows an RF communications circuit 104, according to one embodiment of the present invention. An RF receiver 106 receives an RF input signal $RF_{IN}$ from an antenna 108 through an RF duplexer or switch 110. The RF receiver 106 down converts the RF input signal $RF_{IN}$ to provide a baseband input signal $BB_{IN}$ to a baseband controller 112. The baseband controller 112 provides a baseband output signal $BB_{OUT}$ to an RF transmitter 114, which up converts the baseband output signal $BB_{OUT}$ to provide an RF output signal $RF_{OUT}$ to the antenna 108 through the RF duplexer or switch 110. The second frequency-corrected clock signal $CLK_{SCOR}$ may feed the RF receiver and RF transmitter 106, 114 and may be used as a local oscillator signal for receiving, transmitting, or both. The RF input signal $RF_{IN}$, the baseband input signal $BB_{IN}$, or both, may contain frequency correction information, which is used by the control circuitry 12 to update the frequency correction signal FREQCOR during certain wireless operations. In one embodiment of the present invention, an RF integrated circuit (RFIC) 116 includes the RF receiver 106, the RF transmitter 114, and the RF duplexer or switch 110, a baseband controller integrated circuit (BBIC) includes the baseband controller 112, or both.

FIG. 25 shows details of the baseband controller 112 illustrated in FIG. 24. The baseband controller 112 includes the control circuitry 12, the clock synthesizer and adjustment circuitry 10, the multiplexer 14, the system circuitry 16, and a baseband processor 118, which receives the baseband input signal $BB_{IN}$ and provides the baseband output signal $BB_{OUT}$, and communicates with the system circuitry 16 and the control circuitry 12.

An application example of a baseband controller 112 is its use in a mobile terminal 120, the basic architecture of which is represented in FIG. 26. The mobile terminal 120 may include the RF receiver 106, the RF transmitter 114, the antenna 108, the RF duplexer or switch 110, the baseband processor 118, a control system 122, a frequency synthesizer 124, and an interface 126. The RF receiver 106 receives information bearing radio frequency signals from one or more remote transmitters provided by a base station (not shown). A low noise amplifier (LNA) 128 amplifies the signal. A filter circuit 130 minimizes broadband interference in the received signal, while down conversion and digitization circuitry 132 down converts the filtered, received signal to an intermediate or baseband frequency signal, which is then digitized into one or more digital streams. The RF receiver 106 typically uses one or more mixing frequencies generated by the frequency synthesizer 124, which may provide frequency corrected signals. The baseband processor 118 processes the digitized received signal to extract the information or data bits conveyed in the received signal. This processing typically comprises demodulation, decoding, and error correction operations. As such, the baseband processor 118 is generally implemented in one or more digital signal processors (DSPs).

On the transmit side, the baseband processor 118 receives digitized data, which may represent voice, data, or control information, from the control system 122, which it encodes for transmission. The encoded data is output to the RF transmitter 114, where it is used by a modulator 134 to modulate a carrier signal that is at a desired transmit frequency. Power amplifier circuitry 136 amplifies the modulated carrier signal to a level appropriate for transmission, and delivers the amplified and modulated carrier signal to the antenna 108 through the RF duplexer or switch 110.

A user may interact with the mobile terminal 120 via the interface 126, which may include interface circuitry 138 associated with a microphone 140, a speaker 142, a keypad 144, and a display 146. The interface circuitry 138 typically includes analog-to-digital converters, digital-to-analog converters, amplifiers, and the like. Additionally, it may include a voice encoder/decoder, in which case it may communicate directly with the baseband processor 118. The microphone 140 will typically convert audio input, such as the user's voice, into an electrical signal, which is then digitized and passed directly or indirectly to the baseband processor 118. Audio information encoded in the received signal is recovered by the baseband processor 118, and converted by the interface circuitry 138 into an analog signal suitable for driving the speaker 142. The keypad 144 and display 146 enable the user to interact with the mobile terminal 120, input numbers to be dialed, address book information, or the like, as well as monitor call progress information.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A circuit comprising:
   clock synthesizer and adjustment circuitry adapted to:
      receive a reference clock signal and a frequency correction signal;
      provide a first clock signal based on the reference clock signal and the frequency correction signal; and
      substantially phase-align the first clock signal with the reference clock signal to provide the first clock signal that is phase-aligned prior to a transition between a first mode and a second mode;
   multiplexing circuitry adapted to:
      receive a mode selection signal, which selects one of the first mode and the second mode; and
      provide a system clock signal, which:
         during the first mode is based on the reference clock signal; and
         during the second mode is based on the first clock signal; and
   control circuitry adapted to:
      provide the mode selection signal; and
      transition between the first mode and the second mode when the first clock signal is substantially phase-aligned with the reference clock signal.

2. The circuit of claim 1 wherein:
   the control circuitry is further adapted to provide a clock enable signal, which selects one of an enabled state and a disabled state; and
   the clock synthesizer and adjustment circuitry is further adapted to:
   receive the clock enable signal;
   disable the first clock signal during the disabled state; and
   enable the first clock signal during the enabled state.

3. The circuit of claim 2 wherein the control circuitry is further adapted to:
   transition between the first mode and the second mode during the enabled state; and
   not transition between the first mode and the second mode during the disabled state.

4. The circuit of claim 2 wherein the clock synthesizer and adjustment circuitry comprises a frequency-controlled oscillator, which is:
   powered-down during the disabled state; and
   adapted to provide the first clock signal during the enabled state.

5. The circuit of claim 1 wherein the clock synthesizer and adjustment circuitry comprises:
   clock synthesizer circuitry adapted to:
      receive the reference clock signal and the frequency correction signal; and
      provide a second clock signal based on the reference clock signal and the frequency correction signal; and phase adjustment circuitry comprising:
divider circuitry adapted to divide the second clock signal based on a division constant to provide the first clock signal, such that a frequency of the second clock signal is about equal to the division constant times a frequency of the first clock signal;
phase discrimination circuitry adapted to provide phase information based on comparing a first phase and a second phase, such that the first phase is associated with the first clock signal and the second phase is associated with the reference clock signal; and
dithering circuitry adapted to dither the division constant to substantially phase-align the first clock signal with the reference clock signal to provide the first clock signal that is phase-aligned prior to the transition between the first mode and the second mode based on the phase information.

6. The circuit of claim 5 wherein the dithering circuitry is further adapted to continuously dither the division constant to substantially phase-align the first clock signal with the reference clock signal to provide the first clock signal that is phase-aligned prior to the transition between the first mode and the second mode.

7. The circuit of claim 5 wherein the phase discrimination circuitry comprises a flip-flop circuit adapted to provide the phase information based on comparing the first phase and the second phase.

8. The circuit of claim 1 wherein the control circuitry is further adapted to provide the frequency correction signal, which has a first magnitude and a plurality of magnitudes, such that the first magnitude corresponds to no applied frequency correction and the plurality of magnitudes corresponds to a plurality of applied frequency corrections.

9. The circuit of claim 8 wherein a frequency of the first clock signal is based on a frequency of the reference clock signal and one of the no applied frequency correction and one of the plurality of applied frequency corrections.

10. The circuit of claim 8 wherein the first magnitude is about equal to zero.

11. The circuit of claim 8 wherein when a magnitude of the frequency correction signal is about equal to the first magnitude, a frequency of the first clock signal is about equal to a frequency of the reference clock signal.

12. The circuit of claim 11 wherein when the magnitude of the frequency correction signal is about equal to the first magnitude, the first clock signal is substantially phase-aligned with the reference clock signal.

13. The circuit of claim 8 wherein when a magnitude of the frequency correction signal is about equal to the first magnitude, a frequency of the first clock signal is about equal to an integer multiple of a frequency of the reference clock signal.

14. The circuit of claim 1 further comprising a first divider circuit, which is adapted to:
receive the reference clock signal; and
provide a divided reference clock signal based on dividing the reference clock signal,
wherein during the second mode, the system clock signal is further based on the divided reference clock signal.

15. The circuit of claim 1 wherein the clock synthesizer and adjustment circuitry is further adapted to provide a second clock signal based on the reference clock signal and the frequency correction signal, wherein a frequency of the second clock signal is an integer multiple of a frequency of the first clock signal.

16. The circuit of claim 15 wherein a local oscillator signal in an RF communications circuit is based on the second clock signal.

17. The circuit of claim 1 further comprising a phase comparator circuit, which is adapted to provide phase data based on a difference between a phase of the first clock signal and a phase of the reference clock signal.

18. The circuit of claim 17 wherein the transition between the first mode and the second mode when the first clock signal is substantially phase-aligned with the reference clock signal is based on the phase data.

19. The circuit of claim 17 wherein the clock synthesizer and adjustment circuitry comprises a programmable delay circuit adapted to:
provide the first clock signal; and
phase-adjust the first clock signal based on the phase data,
wherein the phase-adjust the first clock signal provides the substantially phase-align the first clock signal with the reference clock signal to provide the first clock signal that is phase-aligned prior to a transition between the first mode and the second mode.

20. The circuit of claim 1 wherein the clock synthesizer and adjustment circuitry comprises phase-locked loop circuitry:
adapted to provide a second clock signal, such that the first clock signal is further based on the second clock signal and a frequency of the second clock signal is an integer multiple of a frequency of the first clock signal; and
comprising a phase-locked loop divide circuit:
adapted to divide the second clock signal based on a division constant for phase comparison with the reference clock signal; and
comprising dithering circuitry adapted to dither the division constant to phase-adjust the first clock signal.

21. The circuit of claim 20 wherein the dithering circuitry is further adapted to dither the division constant to frequency correct the first clock signal based on the frequency correction signal.

22. The circuit of claim 20 wherein the dithering circuitry is further adapted to dither the division constant to spread frequency content of the system clock signal.

23. The circuit of claim 20 wherein the phase-adjust the first clock signal provides the substantially phase-align the first clock signal with the reference clock signal to provide the first clock signal that is phase-aligned prior to a transition between the first mode and the second mode.

24. A method comprising:
synthesizing a first clock signal based on a reference clock signal and a frequency correction signal;
substantially phase-aligning the first clock signal with the reference clock signal prior to a transition between a first mode and a second mode;
transitioning between the first mode and the second mode when the first clock signal is substantially phase-aligned with the reference clock signal; and
providing a system clock signal, which:
during the first mode is based on the reference clock signal; and
during the second mode is based on the first clock signal.

25. A method comprising:
enabling a first clock signal;
synthesizing the first clock signal based on a reference clock signal and a frequency correction signal;
substantially phase-aligning the first clock signal with the reference clock signal prior to a transition between a first mode and a second mode;

transitioning from the first mode to the second mode when the first clock signal is substantially phase-aligned with the reference clock signal;
providing a system clock signal, which:
during the first mode is based on the reference clock signal; and
during the second mode is based on the first clock signal;

transitioning from the second mode to the first mode when the first clock signal is substantially phase-aligned with the reference clock signal; and
disabling the first clock signal.

* * * * *